United States Patent
Bitou et al.

(10) Patent No.: US 8,154,694 B2
(45) Date of Patent: Apr. 10, 2012

(54) LAMINATED OPTICAL FILM, AND LIQUID CRYSTAL PANEL AND LIQUID CRYSTAL DISPLAY APPARATUS USING THE LAMINATED OPTICAL FILM

(75) Inventors: Masato Bitou, Ibaraki (JP); Shunsuke Shutou, Ibaraki (JP); Nobuyuki Kozonoi, Ibaraki (JP); Ikuo Kawamoto, Ibaraki (JP); Hironori Motomura, Ibaraki (JP); Misaki Sabae, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 381 days.

(21) Appl. No.: 12/516,043

(22) PCT Filed: Oct. 29, 2007

(86) PCT No.: PCT/JP2007/071006
§ 371 (c)(1),
(2), (4) Date: May 22, 2009

(87) PCT Pub. No.: WO2008/068978
PCT Pub. Date: Jun. 12, 2008

(65) Prior Publication Data
US 2010/0053510 A1  Mar. 4, 2010

(30) Foreign Application Priority Data
Dec. 7, 2006 (JP) ................... 2006-330231

(51) Int. Cl.
*G02F 1/1335* (2006.01)
(52) U.S. Cl. .......... 349/118; 349/98; 349/117; 349/119; 349/121
(58) Field of Classification Search .................... 349/98, 349/117–119, 121
See application file for complete search history.

(56) References Cited

U.S. PATENT DOCUMENTS
6,281,952 B1  8/2001 Okamoto et al.
6,330,108 B1 * 12/2001 Nishikouji et al. ...... 359/489.03
(Continued)

FOREIGN PATENT DOCUMENTS
CN  1683972 A  10/2005
(Continued)

OTHER PUBLICATIONS
Korean Office Action dated Feb. 21, 2011, issued in Korean Patent Application No. 2009-0029977.
(Continued)

*Primary Examiner* — Rhonda Peace
(74) *Attorney, Agent, or Firm* — Westerman, Hattori, Daniels & Adrian, LLP

(57) ABSTRACT

Provided are a laminated optical film capable of enhancing a contrast ratio in an oblique direction remarkably while enhancing viewing angle characteristics when being used in a liquid crystal display apparatus or the like, and a liquid crystal panel and a liquid crystal display apparatus using the laminated optical film. The laminated optical film of the present invention includes a polarizer, a first optical compensation layer, and a second optical compensation layer in the stated order, in which the first optical compensation layer has a refractive index profile of nx>nz>ny and is placed so that a slow axis direction thereof is substantially parallel to or substantially perpendicular to an absorption axis direction of the polarizer, and the second optical compensation layer converts linearly polarized light into circularly polarized light or circularly polarized light into linearly polarized light in a visible light region.

16 Claims, 17 Drawing Sheets

U.S. PATENT DOCUMENTS

| | | | |
|---|---|---|---|
| 6,563,554 B2 | 5/2003 | Okamoto et al. | |
| 6,593,982 B2 | 7/2003 | Yoon et al. | |
| 6,717,637 B1 | 4/2004 | Yoon et al. | |
| 6,900,863 B2 | 5/2005 | Okamoto et al. | |
| 6,912,029 B2 * | 6/2005 | Tanaka | 349/118 |
| 6,930,740 B2 | 8/2005 | Yoon et al. | |
| 7,050,132 B2 | 5/2006 | Okamoto et al. | |
| 7,054,049 B2 | 5/2006 | Murakami et al. | |
| 7,227,602 B2 | 6/2007 | Jeon et al. | |
| 7,394,511 B2 | 7/2008 | Okamoto et al. | |
| 7,423,714 B2 | 9/2008 | Chiba et al. | |
| 7,462,381 B2 | 12/2008 | Yoshimi et al. | |
| 7,535,531 B2 * | 5/2009 | Nishikouji et al. | 349/118 |
| 7,538,836 B2 | 5/2009 | Fujita et al. | |
| 7,557,883 B2 | 7/2009 | Kawamoto et al. | |
| 7,630,038 B2 | 12/2009 | Takeda et al. | |
| 7,738,065 B2 | 6/2010 | Shutou et al. | |
| 2001/0007487 A1 | 7/2001 | Yoon et al. | |
| 2001/0048497 A1 | 12/2001 | Miyachi et al. | |
| 2001/0052948 A1 | 12/2001 | Okamoto et al. | |
| 2002/0047968 A1 | 4/2002 | Yoshida et al. | |
| 2003/0067570 A1 | 4/2003 | Okamoto et al. | |
| 2003/0210362 A1 | 11/2003 | Yoon et al. | |
| 2003/0210370 A1 * | 11/2003 | Yano et al. | 349/117 |
| 2004/0004688 A1 * | 1/2004 | Kawata et al. | 349/117 |
| 2004/0160537 A1 | 8/2004 | Okamoto et al. | |
| 2005/0030456 A1 | 2/2005 | Murakami et al. | |
| 2005/0062917 A1 | 3/2005 | Kashima | |
| 2005/0112299 A1 | 5/2005 | Shimizu et al. | |
| 2005/0140900 A1 | 6/2005 | Jeon et al. | |
| 2005/0231660 A1 | 10/2005 | Fujita et al. | |
| 2005/0243248 A1 | 11/2005 | Yoon et al. | |
| 2006/0062934 A1 * | 3/2006 | Hayashi et al. | 428/1.31 |
| 2006/0119752 A1 | 6/2006 | Okamoto et al. | |
| 2006/0203162 A1 | 9/2006 | Ito et al. | |
| 2007/0222919 A1 * | 9/2007 | Chiba et al. | 349/96 |
| 2008/0036954 A1 | 2/2008 | Takahashi et al. | |
| 2008/0170186 A1 | 7/2008 | Okamoto et al. | |
| 2009/0052028 A1 * | 2/2009 | Umemoto et al. | 359/485 |
| 2010/0026936 A1 | 2/2010 | Uesaka et al. | |

FOREIGN PATENT DOCUMENTS

| | | |
|---|---|---|
| JP | 9-325212 | 12/1997 |
| JP | 10068816 A | 3/1998 |
| JP | 11242226 A | 9/1999 |
| JP | 2000-227520 A | 8/2000 |
| JP | 3174367 B2 | 6/2001 |
| JP | 2001209065 A | 8/2001 |
| JP | 2002-055342 A | 2/2002 |
| JP | 2003075635 A | 3/2003 |
| JP | 2004326089 A | 11/2004 |
| JP | 2006-154436 A | 6/2006 |
| JP | 2006-195441 A | 7/2006 |
| JP | 2006-215221 A | 8/2006 |
| JP | 2006-309130 A | 11/2006 |
| JP | 2007-286578 A | 11/2007 |
| JP | 2008-129175 A | 6/2008 |
| KR | 10-0677050 | 1/2007 |
| TW | 200400396 A | 1/2004 |
| TW | 200606477 A | 2/2006 |
| WO | 2006059545 A1 | 6/2006 |

OTHER PUBLICATIONS

International Search Report of PCT/JP2007/073378, Mailing Date of Jan. 15, 2008.

Japanese Office Action dated Feb. 16, 2011, issued in corresponding Japanese Patent Application No. 2007-259012.

International Search Report of PCT/JP2007/070585, mailing date of Dec. 11, 2007.

Japanese Office Action dated Apr. 27, 2011, issued in corresponding Japanese Patent Application No. 2007-259012.

International Search Report PCT/JP2007/071006 , Mailing date of Jan. 22, 2008.

Taiwanese Office Action dated Nov. 1, 2011, issued in corresponding Taiwanese Patent Application No. 096146871.

* cited by examiner

LAMINATED OPTICAL FILM, AND LIQUID CRYSTAL PANEL AND LIQUID CRYSTAL DISPLAY APPARATUS USING THE LAMINATED OPTICAL FILM

TECHNICAL FIELD

The present invention relates to a laminated optical film, and a liquid crystal panel, a liquid crystal display apparatus, and an image display apparatus using the laminated optical film. More specifically, the present invention relates to a laminated optical film capable of enhancing a contrast ratio in an oblique direction remarkably, while enhancing viewing angle characteristics when being used in a liquid crystal display apparatus or the like, and a liquid crystal panel, a liquid crystal display apparatus, and an image display apparatus using the laminated optical film.

BACKGROUND ART

As a liquid crystal display apparatus of a VA mode, a semi-transmission reflection-type liquid crystal display apparatus has been proposed in addition to a transmission-type liquid crystal display apparatus and a reflection-type liquid crystal display apparatus (for example, see Patent Documents 1 and 2). The semi-transmission reflection-type liquid crystal display apparatus enables a display to be recognized visually by using ambient light in a light place in the same way as in the reflection-type liquid crystal display apparatus, and using an internal light source such as a backlight in a dark place. In other words, the semi-transmission reflection-type liquid crystal display apparatus employs a display system of both a reflection-type and a transmission-type, and switches a display mode between a reflection mode and a transmission mode depending upon the ambient brightness. As a result, the semi-transmission reflection-type liquid crystal display apparatus can perform a clear display even in a dark place with the reduction of the power consumption. Therefore, the semi-transmission reflection-type liquid crystal display apparatus can be used preferably for a display part of mobile equipment, for instance.

A specific example of such a semi-transmission reflection-type liquid crystal display apparatus includes a liquid crystal display apparatus that includes a reflective film, which is obtained by forming a window portion for transmitting light on a film made of metal such as aluminum, on an inner side of a lower base material, and allows the reflective film to function as a semi-transmission reflective plate. In the liquid crystal display apparatus described above, in the case of the reflection mode, ambient light entered from an upper base material side passes through a liquid crystal layer, is reflected by the reflective film on the inner side of the lower base material, passes through the liquid crystal layer again, and outgoes from the upper base material side, thereby contributing to a display. On the other hand, in the transmission mode, light from the backlight entered from the lower base material side passes through the liquid crystal layer through the window part of the reflective film, and outgoes from the upper base material side, thereby contributing to a display. Thus, in a region where the reflective film is formed, an area in which the window part is formed functions as a transmission display region, and the other area functions as a reflection display region. However, in the conventional reflection or semi-transmission reflection-type liquid crystal display apparatus of a VA mode, light leakage occurs in a black display to cause a problem of degradation of a contrast, which has been not overcome for a long time.

As an attempt to solve the above-mentioned problem, a laminated optical film including a retardation film having wavelength dispersion characteristics, in which a retardation value decreases toward a short wavelength side is proposed (for example, see Patent Document 3). However, such a conventional laminated optical film has problems of an insufficient viewing angle and poor practical use.

Patent Document 1: JP 11-242226 A
Patent Document 2: JP 2001-209065 A
Patent Document 3: JP 2004-326089 A

DISCLOSURE OF THE INVENTION

Problem to be Solved by the Invention

The present invention has been made in view of solving the above-mentioned conventional problems, and an object of the present invention is to provide a laminated optical film capable of enhancing a contrast ratio in an oblique direction remarkably while enhancing viewing angle characteristics when being used in a liquid crystal display apparatus or the like, and a liquid crystal panel and a liquid crystal display apparatus using the laminated optical film.

Means for Solving the Problems

A laminated optical film of the present invention includes:
a polarizer, a first optical compensation layer, and a second optical compensation layer in the stated order, in which
the first optical compensation layer has a refractive index profile of nx>nz>ny and is placed so that a slow axis direction thereof is substantially parallel to or substantially perpendicular to an absorption axis direction of the polarizer; and
the second optical compensation layer converts linearly polarized light into circularly polarized light or circularly polarized light into linearly polarized light in a visible light region.

In a preferred embodiment, the first optical compensation layer has an Nz coefficient of 0.1 to 0.6.

In a preferred embodiment, the first optical compensation layer is formed of one retardation film (A).

In a preferred embodiment, the retardation film (A) contains at least one kind of thermoplastic resin selected from a norbornene-based resin, a cellulose-based resin, a carbonate-based resin, and an ester-based resin.

In a preferred embodiment, the second optical compensation layer is placed so that the slow axis direction is not substantially parallel to or not substantially perpendicular to the absorption axis direction of the polarizer.

In a preferred embodiment, the second optical compensation layer is formed of one retardation film (B), and is placed so that a slow axis direction of the retardation film (B) is placed substantially at an angle of 45° with respect to the absorption axis direction of the polarizer.

In a preferred embodiment, the retardation film (B) has an in-plane retardation Re[590] at a wavelength of 590 nm larger than an in-plane retardation Re[480] at a wavelength of 480 nm.

In a preferred embodiment, the retardation film (B) includes at least one kind of thermoplastic resin selected from a cellulose-based resin, a carbonate-based resin, a vinyl acetal-based resin, and a norbornene-based resin.

In a preferred embodiment, the second optical compensation layer is formed of two retardation films (C) and (D), the retardation film (C) is placed between the polarizer and the retardation film (D), and an angle α° formed by a slow axis direction of the retardation film (C) and an absorption axis direction of the polarizer and an angle β° formed by a slow axis direction of the retardation film (D) and an absorption axis direction of the polarizer have a relationship of (2α+30)<β<(2α+60).

In a preferred embodiment, the retardation film (C) has an in-plane retardation Re[590] at a wavelength of 590 nm equal to or less than an in-plane retardation Re[480] at a wavelength of 480 nm.

In a preferred embodiment, the retardation film (C) has an in-plane retardation Re[590] at a wavelength of 590 nm equal to or less than an in-plane retardation Re[480] at a wavelength of 480 nm.

In a preferred embodiment, the retardation film (C) and/or the retardation film (D) includes at least one kind of thermoplastic resin chosen from a norbornene-based resin and a carbonate-based resin.

In a preferred embodiment, the laminated optical film includes a third optical compensation layer on a side of the second optical compensation layer opposite to the first optical compensation layer, in which the third optical compensation layer has a refractive index profile of nx=ny>nz.

In a preferred embodiment, the third optical compensation layer includes a retardation film formed of a cholesteric alignment fixed layer.

In a preferred embodiment, the third optical compensation layer includes a retardation film containing an imide-based resin.

According to another aspect of the present invention, a liquid crystal panel is provided. The liquid crystal panel includes the above laminated optical film with a liquid crystal cell.

According to still another aspect of the present invention, a liquid crystal display apparatus is provided. The liquid crystal display apparatus includes the liquid crystal panel.

Effects of the Invention

As described above, according to the present invention, a laminated optical film capable of enhancing a contrast ratio in an oblique direction remarkably while enhancing viewing angle characteristics when being used in a liquid crystal display apparatus or the like, and a liquid crystal panel, a liquid crystal display apparatus, and an image display apparatus using the laminated optical film.

Such effects can be realized by forming a film including a polarizer, a first optical compensation layer with a refractive index profile of nx>nz>ny, and a second optical compensation layer, in the stated order, as a laminated optical film, placing the first optical compensation layer so that a slow axis direction thereof is substantially parallel or substantially perpendicular to an absorption axis direction of the polarizer, and adopting a layer converting linearly polarized light into circularly polarized light or circularly polarized light into linearly polarized light in a visible light region as the second optical compensation layer.

More specifically, due to the synergistic effects obtained by the combination of the optical properties of the respective optical compensation layers and the arrangement method thereof, a contrast ratio in an oblique direction can be enhanced remarkably while viewing angle characteristics are enhanced when the laminated optical film thus obtained is used in a liquid crystal display apparatus or the like, compared with a conventional laminated optical film.

Figure 1:
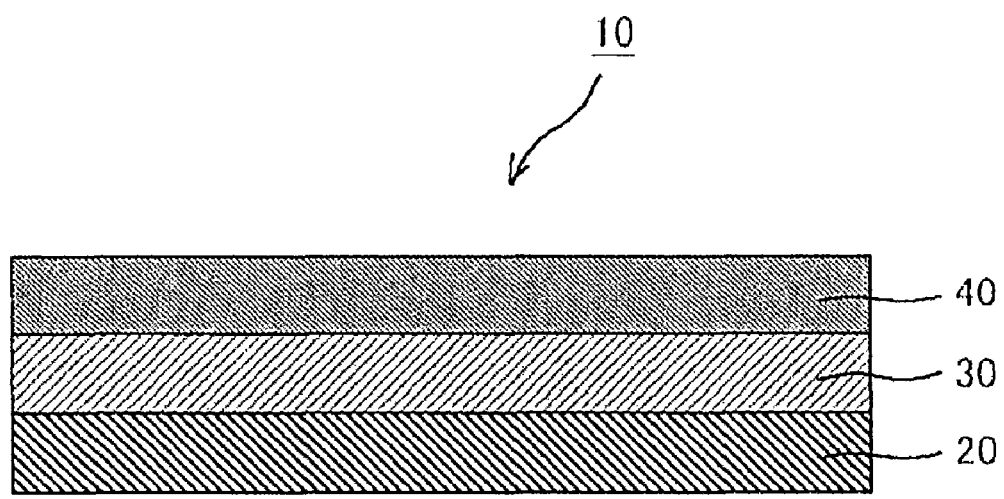
FIG. 1 A schematic cross-sectional view of a laminated optical film according to a preferred embodiment of the present invention.

DESCRIPTION OF SYMBOLS 1 liquid crystal cell
10 laminated optical film
20 polarizer
30 first optical compensation layer
40 second optical compensation layer
50 third optical compensation layer
100 liquid crystal panel
200 liquid crystal display apparatus

BEST MODE FOR CARRYING OUT THE INVENTION

Definitions of Terms and Symbols

Definitions of terms and symbols in the description of the present invention are described below.

(1) The symbol "nx" refers to a refractive index in a direction providing a maximum in-plane refractive index (that is, slow axis direction), the symbol "ny" refers to a refractive index in a direction perpendicular to the slow axis in the plane (that is, fast axis direction), and the symbol "nz" refers to a refractive index in a thickness direction. Further, the expression "nx=ny", for example, not only refers to a case where nx and ny are exactly equal to each other, but also includes a case where nx and ny are substantially equal to each other. In the specification of the present invention, the phrase "substantially equal" includes a case where nx and ny differ within a range providing no effects on overall polarization properties of the laminated film in practical use. Therefore, in a case where there is description of "nx=ny" includes the case where the in-plane retardation Re[590] described below is less than 10 nm.

(2) The term "in-plane retardation Re[590]" refers to an in-plane retardation value of a film (layer) measured at 23° C. by using light of a wavelength of 590 nm. Re[590] can be determined from an equation: $Re[\lambda]=(nx-ny)\times d$, where nx and ny represent refractive indices of a film (layer) at a wavelength of 590 nm in a slow axis direction and a fast axis direction, respectively, and d (nm) represents a thickness of the film (layer). Similarly, for example, the term "in-plane retardation Re[550]" refers to an in-plane retardation value of a film (layer) measured at 23° C. by using light of a wavelength of 550 nm.

(3) The term "wavelength dispersion value D" refers to a value calculated from an equation: $D=Re[480]/Re[590]$.

(4) The term "thickness direction retardation Rth[590]" refers to a thickness direction retardation value measured at 23° C. by using light of a wavelength of 590 nm. Rth[590] can be determined from an equation: $Rth[\lambda](nx-nz)\times d$, where nx and nz represent refractive indices of a film (layer) at a wavelength of 590 nm in a slow axis direction and a thickness direction, respectively, and d (nm) represents a thickness of the film (layer). Similarly, for example, the term "thickness direction retardation Rth[550]" refers to a thickness direction retardation value of a film (layer) measured at 23° C. by using light of a wavelength of 550 nm.

(5) An Nz coefficient can be determined from an expression: $Nz=Rth[590]/Re[590]$.

(6) The term "substantially parallel" as used herein includes the case where an angle formed by optical two axes is $0°\pm2°$ and preferably $0°\pm1°$. The term "substantially perpendicular" as used herein includes the case where an angle formed by optical two axes is $90°\pm2°$ and preferably $90°\pm1°$.

(7) The subscript "1" attached to a term or symbol described herein refers to a first optical compensation layer. The subscript "2" described herein refers to a second optical compensation layer. The subscript "3" described herein refers to a third optical compensation layer. In addition, the subscript "B" described herein refers to a retardation film (B), the subscript "C" described herein refers to a retardation film (C), and the subscript "D" described herein refers to a retardation film (D).

(8) The term "$\lambda/2$ plate" refers to a plate having a function of converting linearly polarized light having a specific vibration direction into linearly polarized light having a vibration direction perpendicular thereto, or converting right-handed circularly polarized light into left-handed circularly polarized light (or converting left-handed circularly polarized light into right-handed circularly polarized light). The $\lambda/2$ plate has an in-plane retardation value of a film (layer) of about ½ with respect to a predetermined light wavelength (generally, in a visible light region).

(9) The term "$\lambda/4$ plate" refers to a plate having a function of converting linearly polarized light of a specific wavelength into circularly polarized light (or converting circularly polarized light into linearly polarized light). The $\lambda/4$ plate has an in-plane retardation value of a film (layer) of about ¼ with respect to a predetermined light wavelength (generally, in a visible light region).

(10) In the present invention, an axis angle of $+\alpha°$ refers to having an axis angle of $\alpha°$ in a counterclockwise direction, seen from a direction in which a liquid crystal cell can be placed finally (direction in which a pressure-sensitive adhesive layer can be formed).

[A. Laminated Optical Film]
[A-1. Entire Configuration of Laminated Optical Film]

FIG. 1 is a schematic cross-sectional view of a laminated optical film according to a preferred embodiment of the present invention. For ease of seeing the figure, it should be noted that the ratio of a vertical size, a horizontal size, and a thickness of each constituent member in the figure is different from an actual ratio.

As shown in FIG. 1, a laminated optical film 10 includes at least a polarizer 20, a first optical compensation layer 30, and a second optical compensation layer 40 in the stated order.

The first optical compensation layer 30 has a refractive index profile of nx>nz>ny. The first optical compensation layer 30 is placed so that a slow axis direction thereof is substantially parallel or substantially perpendicular to an absorption axis direction of the polarizer 20.

The second optical compensation layer 40 is a layer that converts linearly polarized light into circularly polarized light or circularly polarized light into linear polarized light in a visible light region.

The laminated optical film with a configuration as shown in FIG. 1 functions as a circular polarizing plate when being used in a liquid crystal display apparatus, and enables production of a liquid crystal display apparatus with a remarkably higher contrast ratio in an oblique direction compared with a conventional laminated optical film. The laminated optical film with a configuration as shown in FIG. 1 exhibits particularly excellent effects when being used as one of circular polarizing plates in a transmission-type liquid crystal display apparatus using two circular polarizing plates.

Practically, any appropriate protective layer (not shown) or a surface treatment layer (not shown) may be laminated on a side of the polarizer 20 on which the first optical compensation layer 30 is not formed. Further, if required, any appropriate protective layer (not shown) may be provided between the polarizer 20 and the first optical compensation layer 30.

Any appropriate adhesion layer (not shown in FIG. 1) may be provided among respective constituent members (polarizer, each optical compensation layer, etc.) in the laminated optical film of the present invention. In the present invention, the "adhesion layer" refers to a layer that bonds surfaces of members adjacent to each other and integrates them with a practically sufficient adhesion strength and adhesion time. Examples of materials forming the adhesion layer include an adhesive, a pressure-sensitive adhesive, and an anchor coat agent. The adhesion layer may have a multi-layer structure in which an anchor coat layer is formed on the surface of an adherend, and an adhesive layer or a pressure-sensitive adhesive layer is formed on the anchor coat layer. The adhesion layer may be a thin layer (also referred to as hair line) that cannot be recognized with the naked eye.

The total thickness of the laminated optical film of the present invention is preferably 200 to 420 µm, more preferably 210 to 410 µm, and still more preferably 220 to 400 µm, considering the practicality.

[A-2. First Optical Compensation Layer]

The first optical compensation layer is placed between the polarizer and the second optical compensation layer. In the present invention, the arrangement of the first optical compensation layer is important in order to obtain a laminated optical film enabling production of a liquid crystal display apparatus with a remarkably high contrast ratio in an oblique direction, compared with a conventional laminated optical film. When the arrangement of the first optical compensation layer is changed, for example, when a laminated optical film includes a polarizer, a second optical compensation layer, and a first optical compensation layer in the stated order, an excellent contrast ratio in an oblique direction may not be obtained when being used in a liquid crystal display apparatus.

The first optical compensation layer preferably also functions as a protective layer of a polarizer. More specifically, another protective layer may not be provided between the polarizer and the first optical compensation layer. In this case, the first optical compensation layer is preferably attached to the surface of the polarizer via the adhesion layer.

The first optical compensation layer has a refractive index profile of nx>nz>ny. Then, the first optical compensation layer functions so as to correct a geometrical axis shift of the polarizing plate when seen from an oblique direction.

The first optical compensation layer is placed so that a slow axis direction thereof is substantially parallel or substantially perpendicular to an absorption axis direction of the polarizer.

The first optical compensation layer has a function of optically compensating a change in a positional relationship of absorption axes of two polarizers between a front direction and an oblique direction, in the case where the laminated optical film of the present invention is used as one of circular polarizing plates of a transmission-type liquid crystal display apparatus using two circular polarizing plates.

The total thickness of the first optical compensation layer is preferably 20 to 500 μm, more preferably 30 to 200 μm, and still more preferably 40 to 120 μm. When the first optical compensation layer has a thickness in such a range, a liquid crystal display apparatus excellent in optical uniformity can be obtained.

A transmittance ($T_1$) at a wavelength of 590 nm of the first optical compensation layer is preferably 80% or more.

$Re_{1[}590]$ of the first optical compensation layer is preferably 150 to 350 nm, more preferably 180 to 300 nm, and still more preferably 250 to 300 nm.

A Nz coefficient of the first optical compensation layer is preferably 0.1 to 0.6 and more preferably 0.15 to 0.55.

By setting $Re_{1[}590]$ and a Nz coefficient of the first optical compensation layer in the above ranges, a laminated optical film enabling production of a liquid crystal display apparatus with a remarkably high contrast ratio in an oblique direction can be obtained. In particular, it is preferred that the Nz coefficient of the first optical compensation layer be set to be 0.5, because a retardation value can achieve substantially constant properties irrespective of an angle, which makes it easy to achieve the above effects.

The first optical compensation layer may be a single layer or a laminate made of a plurality of layers. The first optical compensation layer is preferably formed of one retardation film (A). In such an embodiment, the thickness of the laminated optical film of the present invention can be reduced, and particularly in the case where the first optical compensation layer also functions as a protective layer of the polarizer, the effects thereof become much more remarkable. Examples of the effects obtained in the case where the first optical compensation layer also functions as a protective layer of the polarizer include reducing the possibility of the inconvenience caused by the influence of a retardation of the protective layer.

An absolute value ($C_{A[}590]$ ($m^2/N$)) of a photoelastic coefficient of the first optical compensation layer is preferably $1 \times 10^{-12}$ to $6 \times 10^{-12}$, and more preferably $1 \times 10^{-2}$ to $6 \times 10^{-12}$. When $C_{A[}590]$ is in the above range, a liquid crystal display apparatus with excellent display uniformity can be obtained.

The retardation film (A) can be formed of any appropriate material as long as the above properties are obtained. The retardation film (A) preferably contains at least one thermoplastic resin selected from a norbornene-based resin, a cellulose-based resin, a carbonate-based resin, and an ester-based resin. The retardation film (A) contains the resin preferably in an amount of 60 to 100 parts by weight with respect to 100 parts by weight of the total solid content.

As used herein, the term "thermoplastic resin" includes a polymer (a so-called high polymer) with a polymerization degree of 20 or more and a large weight average molecular weight, and further includes a polymer (a so-called low polymer: also referred to as an oligomer) with a polymerization degree of 2 or more and less than 20 and a weight average molecular weight of about several thousands.

As used herein, the "resin" may be a single polymer (homopolymer) obtained from one kind of monomer, or a copolymer obtained from at least two kinds of monomers.

The retardation film (A) more preferably contains at least one kind of thermoplastic resin chosen from a norbornene-based resin and a carbonate-based resin. This is because the retardation film is excellent in heat resistance, transparency, and forming processability.

The weight average molecular weight of the thermoplastic resin measured by gel permeation chromatography (GPC) with a tetrahydrofuran solvent is preferably 20,000 to 500,000. The glass transition temperature (Tg) of the thermoplastic resin obtained by a DSC method in accordance with JIS K 7121 is preferably 110° C. to 180° C. By setting the weight average molecular weight and glass transition temperature in the above ranges, a retardation film (A) with satisfactory heat resistance and formability can be obtained.

The norbornene-based rein is a resin polymerized with a norbornene-based monomer being a polymerization unit.

Examples of the norbornene-based monomer include: norbornene, alkyl- and alkylidene-substituted products thereof such as 5-methyl-2-norbornene, 5-dimethyl-2-norbornene, 5-ethyl-2-norbornene, 5-butyl-2-norbornene, and 5-ethylidene-2-norbornene, and substituted products thereof with a polar group such as halogen; dicyclopentadiene and 2,3-dihydrodicyclopentadiene; dimethanoctahydronaphthalene, alkyl- and alkylidene-substituted products thereof, and substituted products thereof with a polar group such as halogen, such as 6-methyl-1,4:5,8-dimethano-1,4,4a,5,6,7,8,8a-octahydronaphthalene, 6-ethyl-1,4:5,8-dimethano-1,4,4a,5,6, 7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8, 8a-octahydronaphthalene, 6-pyridyl-1,4:5,8-dimethano-1,4, 4a,5,6,7,8,8a-octahydronaphthalene, and 6-methoxycarbonyl-1,4:5,8-dimethano-1,4,4a,5,6,7,8,8a-octahydronaphthalene; a trimer and a tetramer of cyclopentadiene such as 4,9:5,8-dimethano-3a,4,4a,5,8,8a,9,9a-octahydro-1H-benzoindene and 4,11:5,10:6,9-trimethano-3a,4, 4a,5,5a,6,9,9a,10,10a,11,11a-dodecahydro-1H-cyclopentaanthracene. The norbornene-based resin may be a copolymer of a norbornene-based monomer and another monomer. In the case of a copolymer, any appropriate arrangement state can be adopted as the arrangement state of molecules thereof. For example, the copolymer may be a random copolymer, a block copolymer, or a graft copolymer.

Examples of the norbornene-based resin include a resin obtained by hydrogenating a ring-opening (co)polymer of a norbornene-based monomer and a resin obtained by subjecting a norbornene-based monomer to addition (co)polymerization. The resin obtained by hydrogenating a ring-opening (co)polymer of a norbornene-based monomer contains a resin obtained by hydrogenating a ring-opening (co)polymer of one or more kinds of norbornene-based monomers and at least one kind selected from α-olefins, cycloalkenes, and non-conjugated dienes. The resin obtained by subjecting a norbornene-based monomer to addition (co)polymerization contains a resin obtained by subjecting one or more kinds of norbornene-based monomers and at least one kind selected from α-olefins, cycloalkenes, and non-conjugated dienes to addition (co)polymerization.

The resin obtained by hydrogenating a ring-opening (co) polymer of a norbornene-based monomer can be obtained as follows: a ring-opening (co)polymer is obtained by subjecting a norbornene-based monomer or the like to a metathesis reaction; and the ring-opening (co)polymer is hydrogenated. Specifically, for example, the method described in the paragraphs [0059] to [0060] in JP 11-116780 A, the method described in the paragraphs [0035] to [0037] in JP 2001-350017 A, and the like are exemplified. The resin obtained by subjecting the norbornene-based monomer to addition (co) polymerization can be obtained by the method described in Example 1 in JP 61-292601 A.

As the polycarbonate-based resin, an aromatic polycarbonate is preferably used. The aromatic polycarbonate can be obtained typically by a reaction of a carbonate precursor substance and an aromatic bivalent phenol compound. Specific examples of the carbonate precursor substance include phosgene, bischloroformate which is a divalent phenol, diphenyl carbonate, di-p-tolyl carbonate, phenyl-p-tolyl carbonate, di-p-chlorophenyl carbonate, and dinaphthyl carbonate. Of those, phosgene and diphenyl carbonate are preferred. Specific examples of the aromatic divalent phenol compound include 2,2-bis(4-hydroxyphenyl)propane, 2,2-bis(4-hydroxy-3,5-dimethylophenyl)propane, bis(4-hydroxyphenyl) methane, 1,1-bis(4-hydroxyphenyl)ethane, 2,2-bis(4-hydroxyphenyl)butane, 2,2-bis(4-hydroxy-3,5-dimethylphenyl)butane, 2,2-bis(4-hydroxy-3,5-dipropylphenyl)propane, 1,1-bis(4-hydroxyphenyl) cyclohexane, and 1,1-bis(4-hydroxyphenyl)-3,3,5-trimethyl cyclohexane. Those may be used alone or in combination. Preferred are 2,2-bis(4-hydroxyphenyl)propane, 1,1-bis(4-hydroxyphenyl)cyclohexane, and 1,1-bis(4-hydroxyphenyl)-3,3,5-trimethyl cyclohexane are preferred. In particular, it is preferred to use 2,2-bis(4-hydroxyphenyl)propane and 1,1-bis(4-hydroxyphenyl)-3,3,5-trimethyl cyclohexane together.

The retardation film (A) may include another appropriate thermoplastic resin. Examples of the another thermoplastic resin include: general-purpose plastics such as a polyolefin resin, a polyvinyl chloride-based resin, a cellulose-based resin, a styrene-based resin, an acrylonitrile-butadiene-styrene-based resin, an acrylonitrile-styrene-based resin, polymethyl methacrylate, polyvinyl acetate, and a polyvinylidene chloride-based resin; general-purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; super engineering plastics such as a polyphenylene sulfide-based resin, a polysulfone-based resin, a polyethersulfone-based resin, a polyether ether ketone-based resin, a polyallylate-based resin, a liquid crystalline resin, a polyamide imide-based resin, a polyimide-based resin, and polytetrafluoroethylene-based resin.

As a method of producing the retardation film (A), any appropriate method can be adopted. Typically, for example, there is a method of forming a thermoplastic resin or a composition containing the thermoplastic resin into a sheet form to obtain a polymer film, and attaching a shrinkable film to one surface or both surfaces of the polymer film, followed by heat-stretching. Examples of the heat-stretching include heat-stretching by longitudinal uniaxial stretching with a roll stretching machine.

The polymer film can be obtained by any appropriate forming method. Examples of the forming method include a compression molding method, a transfer molding method, an injection molding, a extrusion molding, a blow molding, a powder molding method, an FRP molding method, and a solvent casting method.

The shrinkable film is used for providing a shrinkage force in a direction perpendicular to the stretching direction during heat-stretching. This can enhance a shrinkage ratio (nz) in the thickness direction. Examples of materials used for a shrinkable film include polyester, polystyrene, polyethylene, polypropylene, polyvinyl chloride, and polyvinylidene chloride. A polypropylene film is preferably used due to the excellent shrinkage uniformity and heat resistance. As a method of attaching a shrinkable film to both surfaces of the polymer film, a method of attaching by providing a pressure-sensitive adhesive layer between the polymer film and the shrinkable film is preferred due to excellent productivity, workability, and economical efficiency. As a method of increasing or decreasing the Nz coefficient of the retardation film (A), for example, it is preferred to use a shrinkable film with a large shrinkage ratio in the width direction. The shrinkage ratio in the width direction is, for example, 5% to 15% in the width direction at 140° C.

As the method of stretching the polymer film, any appropriate stretching method may be employed. Examples of the stretching method include a longitudinal uniaxial stretching method, a lateral uniaxial stretching method, a longitudinal and lateral simultaneous stretching method, and a longitudinal and lateral sequential stretching method. The stretching direction may be a longitudinal direction (MD direction) or a transverse direction (TD direction). In addition, by using the stretching method described in FIG. 1 in JP 2003-262721 A, the film may be stretched in an oblique direction (oblique stretching).

As the stretching conditions, any appropriate stretching conditions can be adopted. The stretching temperature is preferably equal to or higher than a glass transition temperature (Tg) of the polymer film. This is because the retardation value of the stretched film to be obtained is likely to become uniform, and the film is unlikely to be crystallized (become opaque). The stretching temperature is more preferably Tg+1° C. to Tg+30° C. of the polymer film, still more preferably Tg+2° C. to Tg+20° C., particularly preferably Tg+3° C. to Tg+15° C., and most preferably Tg+5° C. to Tg+10° C. By setting the stretching temperature in such a range, uniform heat-stretching can be performed. Further, it is preferred that the stretching temperature be constant in the film width direction. This is because a stretched film with satisfactory optical uniformity with a small variation in a retardation value can be produced. The stretching ratio can be set to be any appropriate value. The stretching ratio is preferably more than one time and 3 times or less, more preferably 1.05 to 2.00 times, still more preferably 1.10 to 1.50 times, particularly preferably 1.20 to 1.40 times, and most preferably 1.25 to 1.30 times. By setting the stretching ratio in such a range, a stretched film with less shrinkage in the film width and excellent mechanical strength can be obtained. A feed speed during stretching is preferably 0.5 m/min to 30 m/min. in terms of mechanical precision, stability, and the like. By selecting the conditions, a retardation film whose retardation value is likely to become uniform and which has high transparency can be obtained.

Figure 2:
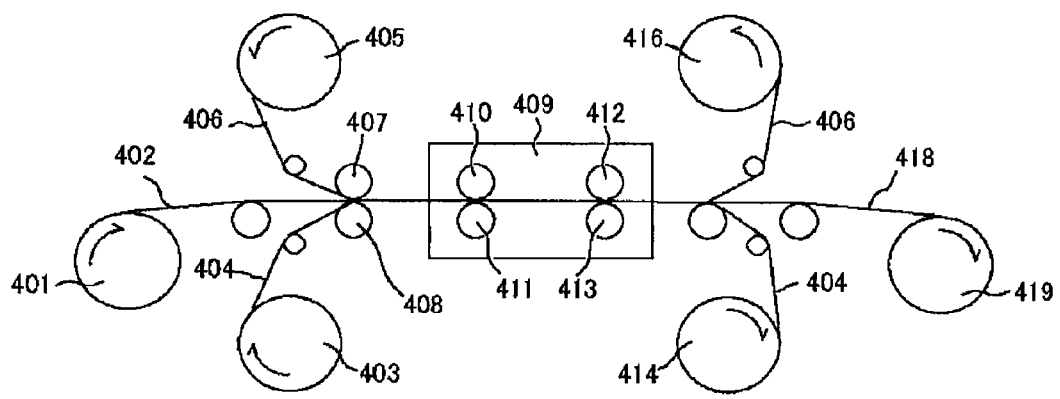
FIG. 2 A schematic view illustrating a concept of a typical production process of a retardation film (A) used in the present invention.

An example of a method of producing the retardation film (A) is described with reference to FIG. 2. FIG. 2 is a schematic view illustrating a concept of a typical production process of the retardation film (A) used in the present invention. For example, a polymer film 402 containing a thermoplastic resin is fed out from a first feed portion 401, and a shrinkable film 404 having a pressure-sensitive adhesive layer fed out from a second feed portion 403 and a shrinkable film 406 having a pressure-sensitive adhesive layer fed out from a third feed portion 405 are attached to both surfaces of the polymer film 402 by laminate rolls 407 and 408. The polymer film with the shrinkable film attached to both surfaces thereof is stretched while being held at a constant temperature by heating means 409 and being provided with a tensile strength in a longitudinal direction of the film by rolls 410, 411, 412, and 413 with different speed ratios (being provided with a tensile strength in the thickness direction simultaneously by the shrinkable film). The shrinkable films 404 and 406 of a stretched film 418 are peeled together with the pressure-sensitive adhesive layers by a first take-up portion 414 and a second take-up portion 416 and the stretched film 418 is taken up by a third take-up portion 419.

[A-3. Second Optical Compensation Layer]

A second optical compensation layer is a layer that converts linearly polarized light into circularly polarized light or a layer that converts circularly polarized light into linearly polarized light in a visible light region. The second optical compensation layer has a function of converting linearly polarized light into circularly polarized light or a function of converting circularly polarized light into linearly polarized light in at least one wavelength in at least a visible light region (typically, 380 nm to 800 nm).

Which the second optical compensation layer has a function of converting linearly polarized light into circularly polarized light or has a function of converting circularly polarized light into linearly polarized light can be determined by a positional relationship between the arrangement position of the laminated optical film and the light source, in the case where the laminated optical film of the present invention is used in a liquid crystal display apparatus. For example, in the case where a light source of a liquid crystal display apparatus is a backlight, and the laminated optical film is placed on a backlight side of a liquid crystal cell, the second optical compensation layer has a function of converting linearly polarized light into circularly polarized light. Alternatively, in the case where the light source of the liquid crystal display apparatus is a backlight, and the laminated optical film is placed on a viewer side of the liquid crystal cell, the second optical compensation layer has a function of converting circularly polarized light into linearly polarized light.

The total thickness of the second optical compensation layer is preferably 20 μm to 500 μm, more preferably 30 to 200 μm, and still more preferably 40 to 12.0 μm. A transmittance ($T_2$) at a wavelength of 590 nm of the second optical compensation layer is preferably 80% or more.

Figure 3:
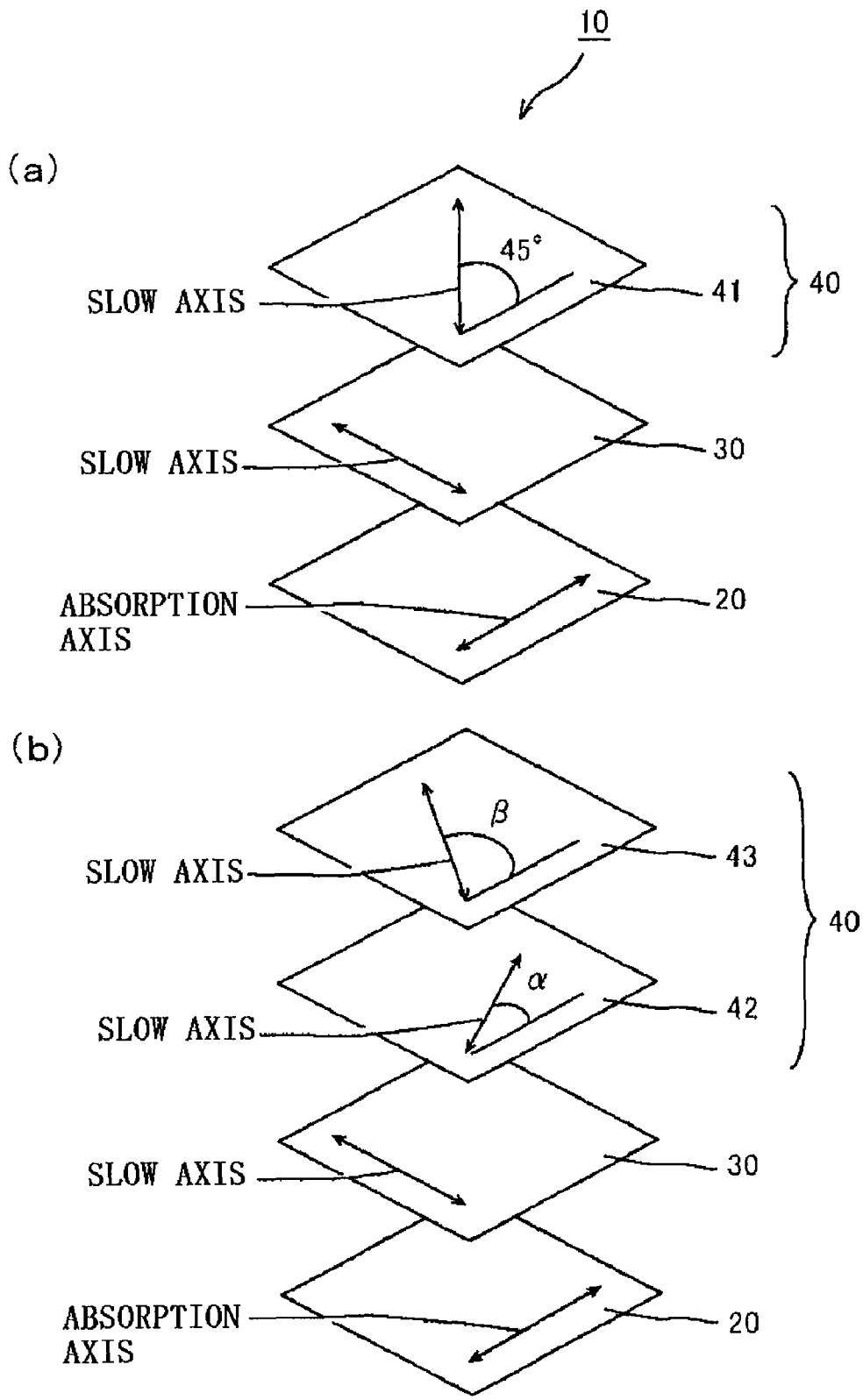
FIG. 3 A schematic perspective view of a laminated optical film according to a preferred embodiment of the present invention.

The second optical compensation layer may be a single layer or a laminate made of a plurality of layers. The second optical compensation layer is preferably formed of one or two retardation films. The second optical compensation layer is preferably placed so that a slow axis direction is not substantially parallel nor perpendicular to an absorption axis direction of the polarizer. An example of the second optical compensation layer is described with reference to FIG. 3.

FIGS. 3(a) and 3(b) are schematic perspective views of a laminated optical film in a preferred embodiment of the present invention. For ease of seeing the figures, it should be noted that the ratio of a vertical size, a horizontal size, and a thickness of each constituent member in the figures is different from an actual ratio.

In one embodiment, as shown in FIG. 3(a), the second optical compensation layer 40 of the laminated optical film 10 of the present invention is formed of one retardation film (B) 41, and an angle formed by the absorption axis direction of the polarizer 20 and the slow axis direction of the retardation film (B) 41 is substantially 45°. As used herein, the term "substantially 45°" includes the case where the angle is 45±5°. In the illustrated example, although the absorption axis direction of the polarizer 20 is substantially perpendicular to the slow axis direction of the first optical compensation layer 30, the absorption axis direction of the polarizer 20 may be substantially parallel to the slow axis direction of the first optical compensation layer 30.

In another embodiment, as illustrated in FIG. 3(b), the second optical compensation layer 40 of the laminated optical film 10 of the present invention is formed of two films: a retardation film (C) 42 and a retardation film (D) 43, and the retardation film (C) 42 is placed between the polarizer 20 and the retardation film (D) 43. Although the illustrated example shows the case where the absorption axis direction of the polarizer 20 is substantially perpendicular to the slow axis direction of the first optical compensation layer 30, the absorption axis direction of the polarizer 20 may be substantially parallel to the slow axis direction of the first optical compensation layer 30.

An angle α° formed by the absorption axis direction of the polarizer 20 and a slow axis of a retardation film (C) 42 and an angle β° formed by the absorption axis direction of the polarizer 20 and a slow axis of the retardation film (D) 43 preferably have a relationship of $(2\alpha+30°)<\beta<(2\alpha+60°)$. The angle α° and the angle β° have a relationship of preferably $(2\alpha+40°)<\beta<(2\alpha+50°)$, and more preferably $(2\alpha+42°)<\beta<(2\alpha+48°)$.

In one embodiment, as illustrated in FIG. 3(a), the second optical compensation layer of the laminated optical film of the present invention is formed of one retardation film (B). In this case, $Re_{B}[590]$ of the retardation film (B) is preferably 80 nm to 180 nm and more preferably 100 nm to 160 nm.

$Re_{B}[590]$ of the retardation film (B) is preferably larger than $Re_{B}[480]$. More specifically, it is preferred that the retardation film (B) exhibit a so-called "reverse wavelength dispersion characteristics". The wavelength dispersion value (DB) of the retardation film (B) is preferably less than 1, and more preferably 0.80 to 0.90. By setting $Re_{B}[590]$ and $Re_{B}[480]$ in the above range, the second optical compensation layer has a function of converting linearly polarized light into circularly polarized light or a function of converting circularly polarized light into linearly polarized light in a wide range of visible light. Consequently, a liquid crystal display apparatus with a high contrast ratio in an oblique direction can be obtained.

An absolute value $(C_{B}[590](m^2/N))$ of a photoelastic coefficient of the retardation film (B) is preferably $1\times10^{-12}$ to $100\times10^{-12}$, and more preferably $1\times10^{-12}$ to $60\times10^{-12}$. By using the retardation film (B) with $C_{B}[590]$ in the above range, a liquid crystal display apparatus with excellent display uniformity can be obtained.

The retardation film (B) preferably has a refractive index profile of $nx>ny\geq nz$ or $nx>nz>ny$. As a material forming the retardation film (B), any appropriate material can be adopted. The retardation film (B) preferably contains a thermoplastic resin having a substituent represented by General Formula (a) or (b). The retardation film (B) preferably contains the thermoplastic resin in an amount of 60 parts by weight to 100 parts by weight with respect to 100 parts by weight of the total solid content.

[Chemical Formula 1]

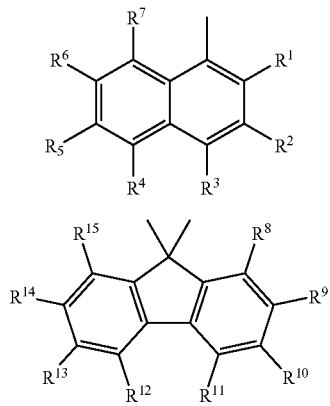

In General Formula (a) or (b), $R^1$ to $R^{15}$ each independently represent a hydrogen atom; a halogen atom; a straight-chain or branched-chain alkyl group having 1 to 4 carbon atoms; a straight-chain or branched-chain alkyl halide having 1 to 4 carbon atoms; a straight-chain or branched-chain alkoxy group having 1 to 4 carbon atoms; a straight-chain or branched-chain thioalkoxy group having 1 to 4 carbon atoms; a straight-chain or branched-chain alkoxycarbonyl group; an acyloxy group; an amino group; an azido group; a nitro group; a cyano group; a hydroxyl group; or a thiol group (where $R^1$ does not represent a hydrogen atom).

A substituent represented by General Formula (a) or (b) is used for controlling the conformation of a polymer bound to the substituent. Specifically, the substituent is considered to be aligned substantially perpendicular to the alignment direction of a polymer main chain of a thermoplastic resin due to the steric hindrance. A retardation film exhibiting excellent reverse wavelength dispersion characteristics can be obtained by using the thermoplastic resin.

The thermoplastic resin that can be used in the retardation film (B) is preferably at least one kind selected from a cellulose-based resin, a carbonate-based resin, an ester-based resin, a vinyl acetal-based resin, and a norbornene-based resin. This is because the thermoplastic resin is excellent in heat resistance, transparency, and forming processability.

In another embodiment, as illustrated in FIG. 3(b), the second optical compensation layer of the laminated optical film of the present invention is formed to two films: a retardation film (C) and a retardation film (D). In this case, $Re_C[590]$ of the retardation film (C) is larger than $Re_D[590]$ of the retardation film (D). [$Re_C[590]-Re_D[590]$] is preferably 80 nm to 180 nm and more preferably 100 nm to 160 nm.

$Re_C[590]$ of the retardation film (C) is preferably 150 nm to 350 nm and more preferably 180 nm to 300 nm. $Re_D[590]$ of the retardation film (D) is preferably 80 nm to 180 nm and more preferably 100 nm to 160 nm. By setting $Re_C[590]$ and $Re_D[590]$ in the above range, a liquid crystal display apparatus with a high contrast ratio in an oblique direction can be obtained.

Re[590] of the retardation film (C) and/or the retardation film (D) is preferably equal to or smaller than Re[480]. More specifically, it is preferred that the retardation film (C) and/or the retardation film (D) exhibit so-called "normal wavelength dispersion characteristics". A wavelength dispersion value ($D_C$) of the retardation film (C) is preferably 1 or more and more preferably 1.00 to 1.20. As the retardation film (D), those which exhibit wavelength dispersion characteristics in the same range as that of the retardation film (C) can be obtained. By setting $Re_C[590]$ and $Re_C[480]$ in the above range, the second optical compensation layer has a function of converting linearly polarized light into circularly polarized light or a function of converting circularly polarized light into linearly polarized light in a wide range of visible light. As a result, a liquid crystal display apparatus with a high contrast ratio in an oblique direction can be obtained.

Absolute values ($C_{C,D}[590]$ ($m^2/N$)) of photoelastic coefficients of the retardation film (C) and the retardation film (D) are preferably $1 \times 10^{-12}$ to $100 \times 10^{-12}$ and more preferably $1 \times 10^{-12}$ to $60 \times 10^{-12}$. By using $C_{C,D}[590]$ in the above range, a liquid crystal display apparatus excellent in display uniformity can be obtained.

The retardation film (C) and/or the retardation film (D) preferably has a refractive index profile of nx>ny≧nz or nx>nz>ny. As materials for forming the retardation film (C) and the retardation film (D), any appropriate materials can be adopted. In the case where a resin is used, the retardation film (C) and the retardation film (D) contains the resin preferably in an amount of 60 parts by weight to 100 parts by weight with respect to 100 parts by weight of the total solid content.

The retardation film (C) and the retardation film (D) preferably contain a norbornene-based resin and/or a carbonate-based resin since excellent heat resistance, transparency, and forming processability can be obtained. As the norbornene-based rein and the carbonate-based resin, those which are described in the above section A-2 can be adopted.

In a case where the second optical compensation layer includes a retardation film having a refractive index profile of nx>ny=nz, examples of the retardation film include a stretched film layer containing a liquid crystal and polycarbonate having a fluorine skeleton (for example, described in JP 2002-48919 A), a stretched film layer containing a cellulose-based material (for example, described in JP 2003-315538 and JP 2000-137116 A), a stretched film layer containing two or more kinds of aromatic polyester polymers having different wavelength dispersion characteristics (for example, described in JP 2002-14234 A), a stretched film layer containing a copolymer having two or more kinds of monomer units derived from monomers forming polymers having different wavelength dispersion characteristics (described in WO 00/26705), and a complex film layer in which two or more kinds of stretched film layers having different wavelength dispersion characteristics are laminated (described in JP 02-120804 A).

In a case where the second optical compensation layer includes a retardation film having a refractive index profile of nx>ny=nz, as a material for forming the retardation film, for example, a single polymer (homopolymer), a copolymer, or a blend of a plurality of polymers may be used. The blend is preferably composed of compatible polymers or polymers having substantially equal refractive indices because the blend needs to be optically transparent. As a material for forming the second optical compensation layer, for example, a polymer described in JP 2004-309617 A can be used preferably.

Specific examples of the combination of the blend are as follows: a combination of a poly(methylmethacrylate) as a polymer having negative optical anisotropy and a poly(vinylydene floride), a poly(ethylene oxide), or a vinylydene floride/trifluoroethylene copolymer as a polymer having positive optical anisotropy; a combination of a polystyrene, a styrene/lauroyl maleimide copolymer, a styrene/cyclohexyl maleimide copolymer, or a styrene/phenyl maleimide copolymer as a polymer having negative optical anisotropy and a poly(phenylene oxide) as a polymer having positive optical anisotropy; a combination of a styrene/maleic anhydride copolymer as a polymer having negative optical anisotropy and a polycarbonate as a polymer having positive optical anisotropy; and a combination of an acrylonitrile/styrene copolymer as a polymer having negative optical anisotropy and an acrylonitrile/butadiene copolymer as a polymer having positive optical anisotropy. Of those, a combination of polystyrene as a polymer having negative optical anisotropy and a poly(phenylene oxide) as a polymer having positive optical anisotropy is preferred from the viewpoint of transparency. As the poly(phenylene oxide), poly(2,6-dimethyl-1,4-phenylene oxide) is exemplified.

Examples of the copolymer include a butadiene/styrene copolymer, an ethylene/styrene copolymer, an acrylonitrile/butadiene copolymer, an acrylonitrile/butadiene/styrene copolymer, a polycarbonate-based copolymer, a polyester-based copolymer, a polyestercarbonate-based copolymer, and a polyarylate-based copolymer. Particularly preferred are a polycarbonate having a fluorene skeleton, a polycarbonate-based copolymer having a fluorene skeleton, a polyester having a fluorene skeleton, a polyester-based copolymer having a fluorene skeleton, a polyestercarbonate having a fluorene skeleton, a polyestercarbonate-based copolymer having a fluorene skeleton, a polyarylate having a fluorene skeleton, and a polyarylate-based copolymer having a fluorene skeleton, because it is possible for a segment having a fluorene skeleton to have negative optical anisotropy.

As the cellulose-based material, any appropriate cellulose-based material may be selected. Specific examples of the cellulose-based material include: cellulose esters such as cellulose acetate and cellulose butyrate; and cellulose ethers such as methyl cellulose and ethyl cellulose. Preferably, cellulose esters such as cellulose acetate and cellulose butyrate are used, and more preferably, cellulose acetate is used. Further, the cellulose-based material may contain an additive such as a plasticizer, a heat stabilizer, and a UV-stabilizer, if required.

A weight average molecular weight Mw of the cellulose-based material is in the range of preferably $3\times10^3$ to $3\times10^5$, and more preferably $8\times10^3$ to $1\times10^5$. By setting the weight average molecular weight Mw in the above range, excellent productivity and satisfactory mechanical strength can be obtained.

The cellulose-based material may have an appropriate substituent depending upon the purpose. Examples of the substituent include: ester groups such as acetate and butyrate; ether groups such as an alkyl ether group and an aralkylene ether group; an acetyl group; and a propionyl group.

It is preferred that the cellulose-based material be substituted by an acetyl group and a propionyl group. The lower limit of the substitution degree of the cellulose-based material "DSac (acetyl substitution degree)+DSpr (propionyl substitution degree)" (showing how much three hydroxyl groups present in a repetition unit of cellulose are substituted, on average, by an acetyl group or a propionyl group) is preferably 2 or more, more preferably 2.3 or more, and still more preferably 2.6 or more. The upper limit of "DSac+DSpr" is preferably 3 or less, more preferably 2.9 or less, and still more preferably 2.8 or less. By setting the substitution degree of the cellulose-based material in the above range, an optical compensation layer having a desired refractive index profile as described above can be obtained.

The lower limit of the above DSpr (propionyl substitution degree) is preferably 1 or more, more preferably 2 or more, and still more preferably 2.5 or more. The upper limit of the DSpr is preferably 3 or less, more preferably 2.9 or less, and still more preferably 2.8 or less. By setting the DSpr in the above range, the solubility of the cellulose-based material with respect to a solvent is enhanced, and the thickness of a first optical compensation layer to be obtained can be controlled easily. Further, by setting "DSac+DSpr" in the above range, and setting the DSpr in the above range, an optical compensation layer having the above optical properties and having reverse wavelength dispersion dependency can be obtained.

The above DSac (acetyl substitution degree) and DSpr (propionyl substitution degree) can be obtained by a method described in paragraphs [0016] to [0019] in JP 2003-315538 A.

A method of substituting by the acetyl group and propionyl group may employ any appropriate method. For example, a cellulose may be treated with a strong caustic soda solution to prepare an alkali cellulose, and the alkali cellulose and a predetermined amount of a mixture of acetic anhydride and propionic anhydride are mixed for acylation. An acyl group is partly hydrolyzed for adjusting the degree of substitution "DSac+DSpr".

[A-4. Third Optical Compensation Layer]

In one embodiment, the laminated optical film of the present invention may further include a third optical compensation layer on a side of the second optical compensation layer opposite to a side where the first optical compensation layer is provided. The third optical compensation layer has a relationship of nx=ny>nz, and can function as a so-called negative C plate. Because the third optical compensation layer has such a refractive index profile, in particular, the birefringence of a liquid crystal layer in a liquid crystal cell of a VA mode can be compensated satisfactorily. More specifically, the third optical compensation layer is used for preventing the viewing angle characteristics from being degraded by losing isotropy due to the influence of liquid crystal molecules when viewed from an oblique direction in a liquid crystal display apparatus of a VA mode (vertical alignment mode). As a result, a liquid crystal display apparatus in which viewing angle characteristics are enhanced remarkably can be obtained. Further, the third optical compensation layer can optically compensate for a liquid crystal cell having a refractive index profile of nz>nx=ny. The third optical compensation layer may be a single layer or a laminate formed of a plurality of layers.

In the description of the present invention, the term "nx=ny" includes not only the case where nx and ny are exactly equal to each other but also the case where nx and ny are substantially equal to each other. Therefore, the third optical compensation layer may have an in-plane retardation $Re_3$, and may have a slow axis. The in-plane retardation $Re_3$ allowable practically as a negative C plate is preferably 0 to 20 nm, more preferably 0 to 10 nm, and still more preferably 0 to 5 nm. A thickness direction retardation $Rth_3$ of the third optical compensation layer is preferably 30 to 500 nm, more preferably 30 to 300 nm, still more preferably 60 to 180 nm, particularly preferably 80 to 150 nm, and most preferably 100 to 120 nm. A transmittance ($T_3$) at a wavelength of 590 nm of the third optical compensation layer is preferably 80% or more.

In the case where the laminated optical film of the present invention further includes the third optical compensation layer on the side of the second optical compensation layer opposite to the side where the first optical compensation layer is provided, according to a preferred embodiment of the liquid crystal panel of the present invention, the laminated optical film is placed on one side of the liquid crystal cell so that the third optical compensation layer is placed on the liquid crystal cell side. In this case, a negative C plate having a relationship of nx=ny>nz may be placed on the side opposite to the laminated optical film seen from the liquid crystal cell (more specifically, a configuration "laminated optical film (third optical compensation layer is placed on the liquid crystal cell side)/liquid crystal cell/negative C plate/any appropriate polarizing plate" is obtained).

For example, in the case of a cholesteric alignment fixed layer (also referred to as a solidified layer and/or cured layer of a liquid crystalline composition aligned in a planar alignment), the thickness of the third optical compensation layer is preferably 0.5 to 10 μm, more preferably 0.5 to 8 μm, and still more preferably 0.5 to 5 μm.

For example, in the case where the third optical compensation layer contains an non-liquid crystalline material, the thickness thereof is preferably 0.5 to 10 μm, more preferably 0.5 to 8 μm, and still more preferably 0.5 to 5 μm.

For example, in the case where the third optical compensation layer is formed of a polymer film, the thickness thereof is preferably 20 to 105 μm, more preferably 35 to 95 μm, and still more preferably 40 to 90 μm.

The third optical compensation layer may have negative refractive index anisotropy and have an optical axis in a direction normal to a layer surface.

The third optical compensation layer is formed of any appropriate layer as long as the above thickness and optical properties are obtained. Preferably, examples of the third optical compensation layer include a cholesteric alignment fixed layer and a layer containing a non-liquid crystalline material.

[A-4-1. Case where Third Optical Compensation Layer is Cholesteric Alignment Fixed Layer]

The cholesteric alignment fixed layer is preferably a cholesteric alignment fixed layer with a wavelength range of selective reflection of 350 nm or less. The upper limit of the wavelength range of selective reflection is more preferably 320 nm or less, and most preferably 300 nm or less. On the other hand, the lower limit of the wavelength range of selective reflection is preferably 100 nm or more, and more preferably 150 nm or more. When the wavelength range of selective reflection exceeds 350 nm, the wavelength range of selective reflection falls in a visible light range, so the problems such as coloring and decoloring may arise. When the wavelength range of selective reflection is smaller than 100 nm, the amount of a chiral agent (described later) to be used becomes too large, so it is necessary to control a temperature during formation of an optical compensation layer very precisely. Consequently, it may be difficult to produce a liquid crystal panel.

The helical pitch of the cholesteric alignment fixed layer is preferably 0.01 to 0.25 μm, more preferably 0.03 to 0.20 μm, and most preferably 0.05 to 0.15 μm. When the helical pitch is 0.01 μm or more, for example, sufficient alignment is obtained. When the helical pitch is 0.25 μm or less, for example, optical rotation on a short wavelength side of visible light can be sufficiently suppressed, so light leakage and the like can be avoided sufficiently. The helical pitch can be controlled by adjusting the kind (distortion force) and amount of a chiral agent described later. By adjusting the helical pitch, the wavelength range of selective reflection can be controlled in a desired range.

In the case where the third optical compensation layer is formed of a cholesteric alignment fixed layer, the third optical compensation layer is formed of any appropriate material as long as the above thickness and optical properties are obtained. Preferably, the second optical compensation layer can be formed of a liquid crystal composition. As a liquid crystal material contained in the composition, any appropriate liquid crystal material can be adopted. A liquid crystal material whose liquid crystal phase is a nematic phase (nematic liquid crystal) is preferred. As such a liquid crystal material, for example, a liquid crystal polymer and a liquid crystal monomer can be used. The expression mechanism of liquid crystallinity of a liquid crystal material may be a lyotropic mechanism or a thermotropic mechanism. Further, it is preferred that the alignment state of liquid crystal be homogeneous alignment.

Preferably, a liquid crystal composition capable of forming the third optical compensation layer further contains at least one of a polymerization initiator and a cross-linking agent (curing agent). By using the polymerization initiator and/or cross-linking agent (curing agent), a cholesteric structure (cholesteric alignment) formed while a liquid crystal material is in a liquid crystal state can be fixed. Any appropriate substance may be used for the polymerization initiator or the cross-linking agent as long as the effect of the present invention can be obtained. Examples of the polymerization initiator include benzoylperoxide (BPO) and azobisisobutyronitrile (AIBN). Examples of the cross-linking agent (curing agent) include a UV-curing agent, a photo-curing agent, and a thermosetting agent. Specific examples thereof include an isocyanate-based cross-linking agent, an epoxy-based cross-linking agent, and a metal chelate cross-linking agent. They may be used alone or in combination.

Specific examples of the cholesteric alignment fixed layer include cholesteric layers described in JP 2003-287623 A.

The cholesteric alignment fixed layer thus formed on the base material is transferred to the surface of a second optical compensation layer via an adhesive layer to become a third optical compensation layer. The transfer further includes the step of peeling the base material from the third optical compensation layer. The thickness of the adhesive layer is preferably 0.1 to 20 μm, more preferably 0.5 to 15 μm, and still more preferably 1 to 10 μm.

[A-4-2. Case where Third Optical Compensation Layer Contains Non-Liquid Crystalline Material]

In the case where the third optical compensation layer contains a non-liquid crystalline material, the third optical compensation layer can adopt any appropriate material as long as the above thickness and optical properties are obtained. For example, as such a material, there is a non-liquid crystalline material. A non-liquid crystalline polymer is particularly preferred. Unlike a liquid crystalline material, such a non-liquid crystalline material can form a film exhibiting an optical uniaxial properties of nx>nz and ny>nz due to properties thereof irrespective of the alignment of the substrate. Consequently, a non-aligned substrate as well as an aligned substrate can be used. Further, even in the case of using a non-aligned substrate, the step of coating an alignment film to the surface thereof, the step of laminating an alignment film, and the like can be omitted.

As the non-liquid crystalline polymer, polymers such as polyamide, polyimide, polyester, polyetherketone, polyamideimide, and polyesterimide are preferred because of excellent heat resistance, chemical resistance, transparency, and rich rigidity. One kind of polymer may be used alone, or the polymers may be used as a mixture of two or more kinds of polymers having different functional groups such as a mixture of polyaryletherketone and polyamide, for example. Among the polymers, polyimide is particularly preferred because of excellent transparency, high alignment property, and high stretching property.

Specific examples of the polyimide and specific examples of a method of forming the third optical compensation layer include the polymer and the method of producing an optical compensation film described in JP 20b4-46065 A.

[A-4-3. Case where Third Optical Compensation Layer is Polymer Film Layer]

Still other specific examples of the material for forming the third optical compensation layer include polymer films formed of a cellulose-based resin such as triacetyl cellulose (TAC), a norbornene-based resin, and the like. As the third optical compensation layer, a commercially available film can be used as it is. Further, a commercially available film subjected to secondary treatment such as stretching treatment and/or shrinking treatment can be used. Examples of the commercially available film include FUJITAC series (ZRF80S, TD80UF, TDY-80UL (trade name)) manufactured by Fuji Photo Film Co., Ltd. and "KC8UX2M" (trade name) manufactured by Konica Minolta Opt Product. The norbornene-based monomer constituting the norbornene-based resin is as described above. Examples of the method of stretching that can satisfy the optical properties include biaxial stretching (longitudinal and lateral equal ratio stretching).

As the third optical compensation layer, a laminate including the polymer film layer and the cholesteric alignment fixed layer may be used.

As a method of laminating the polymer film layer and the cholesteric alignment fixed layer, any appropriate method can be adopted. Specific examples thereof include a method of transferring a cholesteric alignment fixed layer to a polymer film layer and a method of attaching a cholesteric alignment fixed layer previously formed on a base material and a polymer film via an adhesive layer. The thickness of the adhesive layer is preferably 1 μm to 10 μm and more preferably 1 μm to 5 μm.

[A-5. Adhesive Layer and Pressure-Sensitive Adhesive Layer]

The first optical compensation layer is provided with an adhesive layer or a pressure-sensitive adhesive layer on at least one surface thereof and can be attached to the second optical compensation layer.

A thickness of the adhesive layer or pressure-sensitive adhesive layer may be appropriately determined in accordance with intended use, adhesive strength, and the like. The adhesive layer has a thickness of 1 to 500 μm, preferably 1 to 50 μm, and particularly preferably 1 to 20 μm.

Any appropriate adhesive or pressure-sensitive adhesive may be employed for forming the adhesive layer or the pressure-sensitive adhesive layer. Examples thereof include those each containing as a base polymer a polymer such as an acrylic polymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based polymer or a synthetic rubber-based polymer), which can be appropriately selected and used. In particular, an acrylic pressure-sensitive adhesive is preferably used because it is excellent in optical transparency, exhibits pressure-sensitive adhesive properties such as appropriate wettability, cohesiveness, and adhesiveness and is excellent in weather resistance, heat resistance, and the like.

The second optical compensation layer can be attached to a third optical compensation layer with an adhesive layer or a pressure-sensitive adhesive layer.

As the adhesive layer or the pressure-sensitive adhesive layer provided between the second optical compensation layer and the third optical compensation layer, any appropriate adhesive layer or pressure-sensitive adhesive layer is selected depending upon the purpose. Preferably, any appropriate adhesive is used. By using the adhesive layer, it is not necessary to directly apply a coating layer of liquid crystal or the like (for example, an organic solvent in which a liquid crystal monomer is dissolved) to the second optical compensation layer, so the corrosion of the second optical compensation layer by an organic solvent can be prevented, and the second optical compensation layer can be prevented from becoming opaque. Further, when the laminated optical film of the present invention is incorporated into an image display apparatus, the relationship among optical axes of the respective layers is prevented from being shifted, and the respective layers can be prevented from being damaged by rubbing against one another. Further, the interface reflection between layers can be reduced, and a contrast in the case of use in an image display apparatus can be enhanced. A representative example of an adhesive of which each of the above adhesive layers is formed is a curable adhesive. Representative examples of the curable adhesive include: a photocurable adhesive such as a ultraviolet curable adhesive; a moisture curable adhesive; and a thermosetting adhesive. Specific examples of the thermosetting adhesive include thermosetting resin-based adhesives each made of, for example, an epoxy resin, an isocyanate resin, or a polyimide resin. Specific examples of the moisture curable adhesive include isocyanate resin-based moisture curable adhesives. A moisture curable adhesive (in particular, an isocyanate resin-based moisture curable adhesive) is preferred. A moisture curable adhesive is excellent in ease of use because of the following reason: the adhesive reacts with, for example, moisture in the air or adsorbed water on the surface of an adherend, or an active hydrogen group of, for example, a hydroxyl group or a carboxyl group to cure, so the adhesive can be cured naturally by being left after the application of the adhesive. Further, there is no need for heating the adhesive to a high temperature for the curing of the adhesive, so a second optical compensation layer are not heated to high temperatures during lamination (bonding). As a result, the cracking or the like of each of a third optical compensation layer at the time of the lamination of the layer can be prevented even when the layer has an extremely small thickness because there is no worry about the shrinkage due to heating. In addition, a curable adhesive hardly expands even when the adhesive is heated after its curing. Therefore, the cracking or the like of the third optical compensation layer can be prevented even when the third optical compensation layer has an extremely small thickness, and a liquid crystal panel to be obtained is used under high temperature conditions. It should be noted that the above term "isocyanate resin-based adhesive" is a general name for a polyisocyanate resin-based adhesive, a polyurethane resin adhesive, and the like.

For example, a commercially available adhesive may be used as the curable adhesive, or various curable resins may be dissolved or dispersed in a solvent to prepare a curable resin adhesive solution (or dispersion). In the case where the solution (or dispersion) is prepared, a ratio of the curable resin in the solution is preferably 10 to 80 wt %, more preferably 20 to 65 wt %, especially preferably 25 to 65 wt %, and most preferably 30 to 50 wt % in solid content. Any appropriate solvent may be used as the solvent to be used depending on the kind of the curable resin, and specific examples thereof include ethyl acetate, methyl ethyl ketone, methyl isobutyl ketone, toluene, and xylene. They may be used alone or in combination.

An application amount of the adhesive may be appropriately set depending on purposes. For example, the application amount is preferably 0.3 to 3 ml, more preferably 0.5 to 2 ml, and most preferably 1 to 2 ml per area ($cm^2$) of the second optical compensation layer.

After the application, the solvent in the adhesive is evaporated through natural drying or heat drying as required. A thickness of the adhesive layer to be obtained is preferably 0.1 to 20 μm, more preferably 0.5 to 15 μm, and most preferably 1 to 10 μm.

Microhardness of the adhesive layer is preferably 0.1 to 0.5 GPa, more preferably 0.2 to 0.5 GPa, and most preferably 0.3 to 0.4 GPa. Correlation between Microhardness and Vickers hardness is known, and thus the Microhardness can be converted into Vickers hardness. Microhardness can be calculated from indentation depth and indentation load by using, for example, a thin-film hardness meter (MH4000 or MHA-400 (trade name), for example) manufactured by NEC Corporation.

A method of forming the adhesive layer is appropriately selected depending upon the purpose. For example, the curing temperature of the adhesive is appropriately set depending upon an adhesive to be used or the like. The curing temperature is preferably 30 to 90° C., and more preferably 40 to 60° C. By curing an adhesive in these temperature ranges, foaming can be prevented from being generated in the adhesive layer. Further, rapid curing can be prevented. Further, the curing time is appropriately set depending upon an adhesive to be used, the above curing temperature, and the like. The curing time is preferably 5 hours or more, and more preferably about 10 hours. By forming an adhesive layer under these conditions, an adhesive layer that is easy to handle can be obtained.

[A-6. Polarizer]

Any appropriate polarizer may be employed as the polarizer in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated product of a polyvinyl alcohol or a dehydrochlorinated product of a polyvinyl chloride. Of those, a polarizer prepared by adsorbing a dichromatic substance such as iodine on a polyvinyl alcohol-based film and uniaxially stretching the film is particularly preferred because of high polarized dichromaticity. A thickness of the polarizer is not particularly limited, and is generally about 1 to 80 μm.

The polarizer prepared by adsorbing iodine on a polyvinyl alcohol-based film and uniaxially stretching the film may be produced by, for example: immersing a polyvinyl alcohol in an aqueous solution of iodine for coloring, and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washing away of an antiblocking agent, but also provides an effect of preventing unevenness such as uneven coloring by swelling the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

[A-7. Protective Layer]

The laminated optical film of the present invention may include a protective layer on at least one surface of the polarizer. The protective layer may employ any appropriate film which can be used as a protective film of a polarizing plate. Specific examples of a material to be included as a main component of the film include: a cellulose-based resin such as triacetyl cellulose (TAC); and a transparent resin such as a polyester-based resin, a polyvinyl alcohol-based resin, a polycarbonate-based resin, a polyamide-based resin, a polyimide-based resin, a polyethersulfone-based resin, a polysulfone-based resin, a polystyrene-based resin, a polynorbornene-based resin, a polyolefin-based resin, a (meth)acrylic resin, and an acetate-based resin. Other examples thereof include: a thermosetting resin and a UV-curable resin, such as a (meth)acrylic resin, an urethane-based resin, a (meth)acrylurethane-based resin, an epoxy-based resin, and a silicone-based resin. Still another example thereof is a glassy polymer such as a siloxane-based polymer. Further, a polymer film described in JP 2001-343529 A (WO 01/37007) may also be used. A material for the film may employ a resin composition containing a thermoplastic resin having a substituted or unsubstituted imide group on a side chain, and a thermoplastic resin having a substituted or unsubstituted phenyl group and nitrile group on a side chain, for example. A specific example thereof is a resin composition containing an alternating isobutene/N-methylmaleimide copolymer, and an acrylonitrile/styrene copolymer. The polymer film may be an extrusion molded product of the resin composition described above, for example.

The (meth)acrylic resin has a Tg (glass transition temperature) of preferably 115° C. or higher, more preferably 120° C. or higher, still more preferably 125° C. or higher, and particularly preferably 130° C. or higher. This is because the (meth) acrylic resin having such a Tg can be excellent in durability. The upper limit of Tg of the (meth)acrylic resin is not particularly limited but is preferably 170° C. or lower in view of formability and the like.

As the (meth)acrylic resin, any appropriate (meth)acrylic resin may be employed as long as the effects of the present invention are not impaired. Examples thereof include poly (meth)acrylate such as polymethyl methacrylate, a methyl methacrylate-(meth)acrylic acid copolymer, a methyl methacrylate-(meth)acrylate copolymer, a methyl methacrylate-acrylate-(meth)acrylic acid copolymer, a methyl(meth)acrylate-styrene copolymer (MS resin), and polymers having an alicyclic hydrocarbon group (for example, a methyl methacrylate-cyclohexyl methacrylate copolymer, a methyl methacrylate-norbornyl(meth)acrylate copolymer, and the like) Preferred are poly $C_{1-6}$ alkyl(meth)acrylates such as polymethyl (meth)acrylate. More preferred are a methyl methacrylate-based resin having a methyl methacrylate as a main component (50 to 100 wt %, preferably 70 to 100 wt %).

Specific examples of the (meth) acrylic resin include ACRYPET VH and ACRYPET VRL20A manufactured by Mitsubishi Rayon Co., Ltd., a (meth)acrylic resin having a ring structure in the molecule described in JP 2004-70296 A, and a (meth)acrylic resin which is obtained by an intramolecular cross linking or an intramolecular cyclization reaction and has a high Tg.

As the (meth)acrylic resin, a (meth)acrylic resin having a lactone ring structure from the viewpoint of high heat resistance, high transparency, and high mechanical strength.

Examples of the (meth)acrylic resin having a lactone ring structure include (meth)acrylic resins having lactone ring structures described in JP 2000-230016 A, JP 2001-151814 A, 2002-120326 A, JP 2002-254544 A, JP 2005-146084 A, and the like.

The (meth)acrylic resin having a lactone ring structure has a mass average molecular weight (may be referred to as weight average molecular weight) of preferably 1,000 to 2,000,000, more preferably 5,000 to 1,000,000, still more preferably 10,000 to 500,000, and particularly preferably 50,000 to 500,000.

The (meth)acrylic resin having a lactone ring structure has a Tg (glass transition temperature) of preferably 115° C. or higher, more preferably 125° C. or higher, still more preferably 130° C. or higher, particularly preferably 135° C. or higher, and most preferably 140° C. or higher. This is because the (meth)acrylic resin having a lactone ring with such a Tg can be excellent in durability. The upper limit of the Tg of the (meth)acrylic resin having a lactone ring structure is not particularly limited, and is preferably 170° C. or lower in view of formability and the like.

As used herein, the "(meth) acrylic" refers to acrylic and/or methacrylic.

The protective layer is preferably transparent and colorless. Specifically, a thickness direction retardation value Rth [550] of the protective layer is preferably −20 nm to +20 nm, more preferably −10 nm to +10 nm, still more preferably −6 nm to +6 nm, and particularly preferably −3 nm to +3 nm. The in-plane retardation Re[550] of the protective layer is preferably 0 to 10 nm, more preferably 0 to 6 nm, and still more preferably 0 to 3 nm.

As the thickness of the above protective layer, any appropriate thickness can be adopted as long as the above preferred thickness direction retardation Rth is obtained. The thickness of the protective layer is typically 5 mm or less, more preferably 1 mm or less, still more preferably 1 to 500 μm, and particularly preferably 5 to 100 μm.

The side of the protective layer opposite to the polarizer can be subjected to hard coat treatment, antireflection treatment, anti-sticking treatment, antiglare treatment, and the like, if required.

As the protective layer, for example, a cellulose-based film is used. As described above, for example, in the case of a triacetyl cellulose film, a cellulose-based film used as a protective film generally has a thickness direction retardation Rth of about 40 nm at a thickness of 40 μm. The cellulose-based film having a large thickness direction retardation Rth is subjected to an appropriate treatment for reducing the thickness direction retardation Rth, whereby a protective layer satisfying the optical properties can be obtained.

As the treatment for reducing the thickness direction retardation Rth, any appropriate treatment method can be adopted. Examples of the treatment method include a method of attaching a base material made of polyethylene terephthalate, polypropylene, stainless steel, or the like coated with a solvent such as cyclopentanone or methyl ethyl ketone to a general cellulose-based film, drying the laminate by heating (for example, about 80 to 150° C. for 3 to 10 minutes), and peeling the base material film; and a method of applying a solution, in which norbornene-based resin, an acrylic resin, or the like is dissolved in a solvent such as cyclopentanone or methyl ethyl ketone, to a general cellulose-based film, drying the laminate by heating (for example, about 80 to 150° C. for 3 to 10 minutes), and peeling the coating film.

Examples of the material forming the cellulose-based film preferably include fatty acid-substituted cellulose-based polymers such as diacetyl cellulose and triacetyl cellulose. Although the acetic acid substitution degree of triacetyl cellulose used generally is about 2.8, preferably by controlling the acetic acid substitution degree to 1.8 to 2.7 or more preferably by controlling the propionic acid substitution degree to 0.1 to 1, the thickness direction retardation (Rth) can be reduced.

By adding a plasticizer such as dibutylphthalate, p-toluene sulfoneanilide, or acetyl triethyl cit rate to the fatty acid-substituted cellulose-based polymer, the thickness direction retardation Rth can be reduced.

The adding amount of the plasticizer is preferably 40 parts by weight or less, more preferably 1 to 20 parts by weight, and still more preferably 1 to 15 parts by weight with respect to 100 parts by weight of the fatty acid-substituted cellulose-based polymer.

The technologies for reducing the thickness direction retardation Rth as described above may be combined appropriately.

[A-8. Other Structural Components]

The laminated optical film of the present invention may be provided with other optical layers. As the other optical layers, any appropriate optical layers may be employed in accordance with the purpose and the types of image display apparatus. Specific examples thereof include a liquid crystal film, a light scattering film, a diffraction film, and another optical compensation layer (retardation film).

The laminated optical film of the present invention may further include a pressure-sensitive adhesive layer or adhesive layer as an outermost layer on at least one side thereof. In this way, the laminated optical film includes the pressure-sensitive adhesive layer or adhesive layer as an outermost layer, to thereby facilitate lamination with another member (for example, a liquid crystal cell) and prevent the polarizing plate from peeling off from another member. Any appropriate materials may be used as the material for forming the pressure-sensitive adhesive layer. Specific examples of the pressure-sensitive adhesive are described above. Specific examples of the adhesive are described above. Preferably, a material having excellent moisture absorption property or excellent heat resistance is used for preventing foaming or peeling due to moisture absorption, degradation in optical properties due to difference in thermal expansion or the like, warping of the liquid crystal cell, and the like.

For practical use, a surface of the pressure-sensitive adhesive layer or adhesive layer is covered by any appropriate separator to prevent contamination until the polarizing plate is actually used. The separator may be formed by a method of providing a release coat on any appropriate film by using a releasing agent such as a silicone-based, long chain alkyl-based, or fluorine-based, or molybdenum sulfide as required.

Each of the layers of the laminated optical film of the present invention may be subjected to treatment with a UV absorber such as a salicylate-based compound, a benzophenone-based compound, a benzotriazole-based compound, a cyanoacrylate-based compound, or a nickel complex salt-based compound, to thereby impart UV absorbing property.

[B. Method of Producing Laminated Optical Film]

As a method of producing the laminated optical film of the present invention, any appropriate method can be adopted as long as the effects of the present invention are not impaired. Next, an example of a specific procedure of the method of producing the laminated optical film of the present invention is described. Note that the production method is not limited to this method.

The polarizer can be laminated at any appropriate point in the production method of the present invention. For example, the polarizer may be laminated after the first compensation layer, the second optical compensation layer, and the third compensation layer may be attached to each other.

As a method of laminating the polarizer, any appropriate lamination method (for example, bonding) can be adopted. The bonding can be performed using any appropriate adhesive or pressure-sensitive adhesive. The kind of the adhesive or pressure-sensitive adhesive can be selected appropriately depending upon the kind of an adherend. The thickness of the adhesive or pressure-sensitive adhesive is preferably 10 to 200 nm, more preferably 30 to 180 nm, and most preferably 50 to 150 nm.

Hereinafter, an example of a method of producing the laminated optical film of the present invention is described.

The adhesive (for example, an isocyanate resin-based adhesive) is applied to a side of the second optical compensation layer. As the application method, any appropriate method (typically, a method of flow-spreading an application liquid) can be adopted. Specific examples include a roll coating, a spin coating, a wire bar coating, a dip coating, an extrusion coating, a curtain coating, and a spray coating. Of those, a spin coating and an extrusion coating are preferred in terms of an application efficiency.

The third optical compensation layer formed on the base material is transferred to the surface of the second optical compensation layer via the adhesive layer. The transfer further includes the step of peeling the base material from the third optical compensation layer. Next, the adhesive is cured. The curing temperature is appropriately set depending upon an adhesive to be used. The curing temperature is preferably 30 to 90° C., and more preferably 40 to 60° C. By curing an adhesive in these temperature ranges, foaming can be prevented from being generated in an adhesive layer. Further, rapid curing can be prevented. Further, the curing time is set appropriately depending upon an adhesive to be used, the above curing temperature, and the like. The curing time is preferably 5 hours or more, and more preferably about 10 hours. The thickness of an adhesive layer to be obtained is preferably 0.1 µm to 20 µm, more preferably 0.5 µm to 15 µm, and most preferably 1 µm to 10 µm.

Next, a first optical compensation layer is laminated on a laminate of the second optical compensation layer and the third optical compensation layer obtained as described above via a pressure-sensitive adhesive layer or an adhesive layer. As the pressure-sensitive adhesive layer and the adhesive layer that can be used at this time, those which are described above can be exemplified.

Next, a polarizer is laminated on the laminate of the first optical compensation layer, the second optical compensation layer, and the third optical compensation layer thus obtained via a pressure-sensitive adhesive layer or an adhesive layer. As the pressure-sensitive adhesive layer and the adhesive layer that can be used at this time, those which are described above can be exemplified. A protective layer may be previously laminated on the polarizer.

In the present invention, it is important that the polarizer is laminated on the laminate with the directions adjusted so that an angle formed by the polarizer and the optical axis of the first optical compensation layer is in a desired range. More specifically, the polarizer and the laminate are placed so that a slow axis direction of the first optical compensation layer is substantially parallel or substantially perpendicular to an absorption axis direction of the polarizer.

In the present invention, it is preferred that the polarizer be laminated on the laminate with the directions adjusted so that an angle formed by the polarizer and the optical axis of the second optical compensation layer is in a desired range. More specifically, it is preferred that the polarizer and the laminate are placed so that the slow axis direction of the second optical compensation layer is not substantially parallel to nor substantially perpendicular to the absorption axis direction of the polarizer.

[C. Application Purposes of Laminated Optical Film]

The laminated optical film of the present invention may suitably be used for various image display apparatuses (for example, a liquid crystal display apparatus and a self-luminous display apparatus). Specific examples of applicable image display apparatuses include a liquid crystal display apparatus, an EL display, a plasma display (PD), and a field emission display (FED). In the case where the laminated optical film of the present invention is used for a liquid crystal display apparatus, the laminated optical film is useful for prevention of light leakage in black display and for compensation of viewing angle. The laminated optical film of the present invention is preferably used for a liquid crystal display apparatus of a VA mode, and is particularly preferably used for a reflective or semi-transmission-type liquid crystal display apparatus of a VA mode. In the case where the laminated optical film of the present invention is used for an EL display, the laminated optical film is useful for prevention of electrode reflection.

[D. Liquid Crystal Panel]

Figure 4:
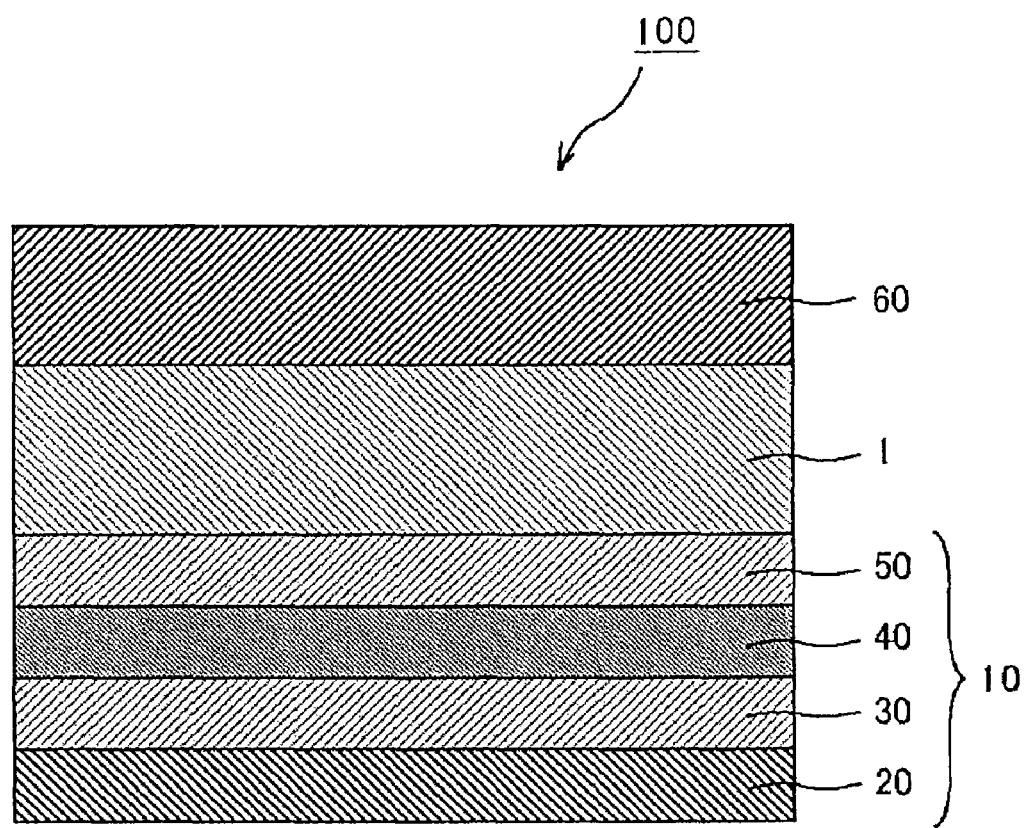
FIG. 4 A schematic cross-sectional view of a liquid-crystal panel used in a liquid crystal display apparatus according to a preferred embodiment of the present invention.

The liquid crystal panel of the present invention includes the laminated optical film of the present invention and a liquid crystal cell. FIG. 4 is a schematic cross-sectional view of a liquid crystal panel according to a preferred embodiment of the present invention. For ease of seeing the figure, it should be noted that the ratio of a vertical size, a horizontal size, and a thickness of each constituent member in the figure is different from an actual ratio. A liquid crystal panel 100 includes at least a liquid crystal cell 1, a laminated optical film 10 placed on one side of the liquid crystal cell 1, and any circular polarizing plate 60 placed on the other side of the liquid crystal cell 1. The illustrated example illustrates the liquid crystal panel having a configuration in which the laminated optical film 10 is placed under the liquid crystal cell; however, the liquid crystal panel may have a configuration obtained by inverting the liquid crystal panel illustrated in FIG. 4.

The liquid crystal cell preferably contains liquid crystal molecules aligned homeotropically. As used herein, the "homeotropic arrangement" refers to a state in which the alignment vector of the liquid crystal molecules is aligned vertically (in a normal direction) with respect to the substrate plane as a result of the interaction between the substrate subjected to an alignment treatment and the liquid crystal molecules. The index ellipsoid of the liquid crystal cell shows a relationship of nz>nx=ny. The homeotropic arrangement includes the case where the alignment vector of the liquid crystal molecules is tilted slightly with respect to the substrate normal direction, i.e., the case where the liquid crystal molecules have a pretilt. In the case where the liquid crystal molecules have a pretilt, the pretilt angle (angle from the substrate normal line) is preferably 5° or less. By setting the pretilt angle in the above range, a liquid crystal display apparatus with a high contrast ratio can be obtained.

As the liquid crystal cell whose index ellipsoid shows a relationship of nz>nx=ny, according to the classification based on the driving modes, there are a vertical alignment (VA) mode and a vertical alignment ECB (electrically controlled birefringence) mode.

$Rth_{LC}[590]$ of the liquid crystal cell in the absence of an electric field is preferably −500 nm to −200 nm and more preferably −400 nm to −200 nm. $Rth_{LC}[590]$ is set appropriately by the birefringence of liquid crystal molecules and the cell gap. The cell gap (substrate interval) of the liquid crystal cell is generally 1.0 μm to 7.0 μm.

[E. Liquid Crystal Display Apparatus]

Figure 5:
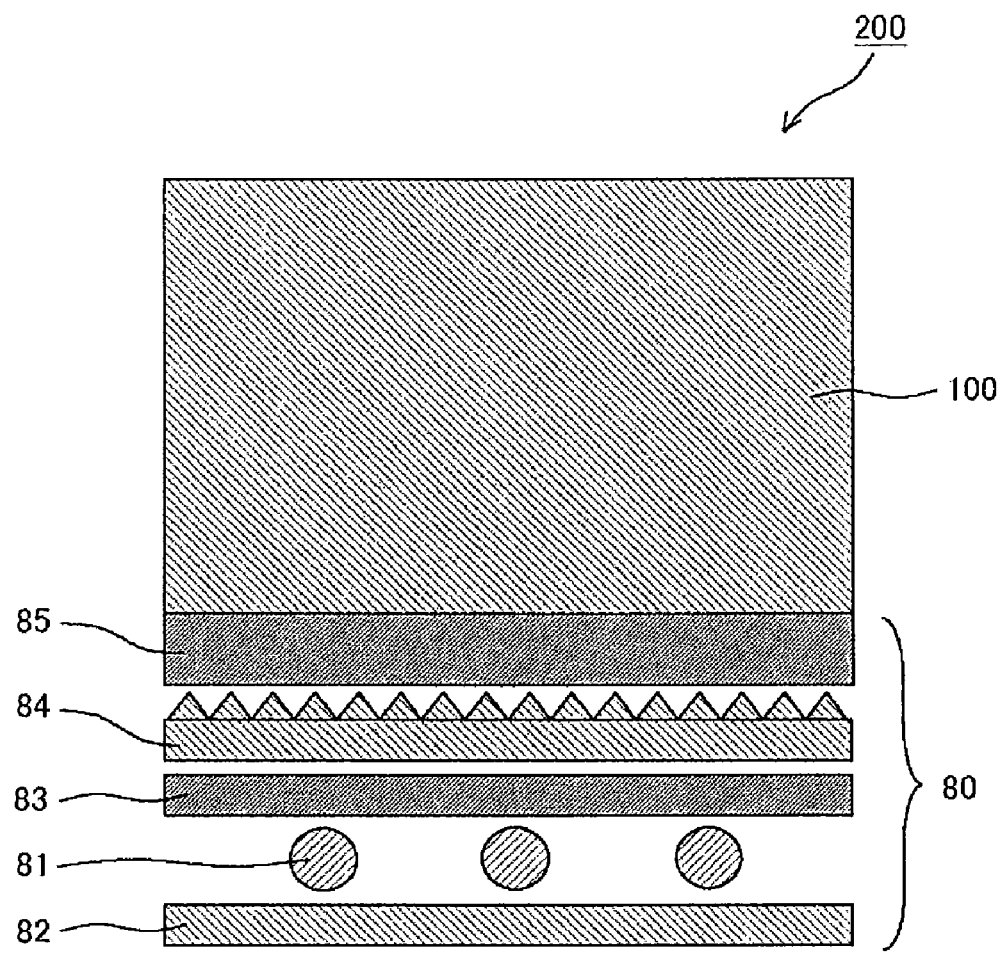
FIG. 5 A schematic cross-sectional view of a liquid crystal display apparatus according to a preferred embodiment of the present invention.

The liquid crystal display apparatus of the present invention includes the liquid crystal panel of the present invention. FIG. 5 is a schematic cross-sectional view of a liquid crystal display apparatus according to a preferred embodiment of the present invention. For ease of seeing the figure, it should be noted that the ratio of a vertical size, a horizontal size, and a thickness of each constituent member in the figure is different from an actual ratio. A liquid crystal display apparatus 200 includes at least a liquid crystal panel 100 and a backlight unit 80 placed on one side of the liquid crystal panel 100. In the illustrated example, the case of adopting a direct type for the backlight unit is shown; however, the backlight unit may be a sidelight type.

In the case where the direct type is adopted, the backlight unit 80 preferably includes at least a light source 81, a reflective film 82, a diffusion plate 83, a prism sheet 84, and a brightness enhancement film 85. In the case where the sidelight type is adopted, preferably, the backlight unit further includes at least a light guiding plate and a light reflector in addition to the above configuration. In the optical members illustrated in FIG. 5, parts thereof can be omitted or can be replaced by other optical members depending upon the applications such as an illumination system of the liquid crystal display apparatus and a driving mode of a liquid crystal cell, as long as the effects of the present invention are obtained.

The liquid crystal display apparatus may have a transmission-type in which a screen is viewed with light irradiated from a back surface of the liquid crystal panel or a reflection-type in which the screen is viewed with light irradiated from a viewer side of the liquid crystal panel. Alternatively, the liquid crystal display apparatus may be a semi-transmission-type that has both properties of the transmission-type and the reflection-type.

EXAMPLE

The present invention is described in more detail by using the following examples. However, the present invention is not limited to the examples.

(1) Measurement of Retardation Value, Nz Coefficient, and Transmittance T

The values were measured automatically by using a "KOBRA21-WPR" (trade name, manufactured by Oji Scientific Instruments). The measurement temperature was 23° C. As the average refractive index, the value was measured by using an Abbe refractometer "DR-M4" (trade name, manufactured by Atago Co., Ltd.).

(2) Measurement of a Thickness:

A thickness of less than 10 μm was measured by using a thin film thickness spectrophotometer "Multichannel photodetector MCPD-2000" (trade name, manufactured by Otsuka Electronics Co., Ltd.). A thickness of 10 μm or more was measured by using a digital micrometer "KC-351C-type" (trade name, manufactured by Anritsu Corporation).

(3) Viewing Angle Characteristics

The viewing angle characteristics of a VA-mode liquid crystal cell with a laminated optical film mounted thereon were measured, using a viewing angle characteristics measurement apparatus (EZ contrast, manufactured by ELDIM SA). The viewing angle characteristics were also measured by computer simulation, using a simulator for a liquid crystal display "LCD MASTER" manufactured by Syntec Corporation.

Production Example 1

Production of Polarizing Plate

A polyvinyl alcohol film was dyed in an aqueous solution containing iodine, and uniaxially stretched 6 times between rolls having different speeds in an aqueous solution containing boric acid to obtain a polarizer. A triacetyl cellulose film (thickness: 40 μm) (KC4UYW (trade name) manufactured by Konica Minolta Opto, Inc.) was attached as a protective layer to both sides of the polarizer thus obtained via a polyvinyl alcohol-based adhesive (thickness: 0.1 μm). The in-plane retardation Re of the protective layer was 0.9 nm and the thickness direction retardation Rth was 1.2 nm. Thus, a polarizing plate was obtained.

Production Example 2

Production of First Optical Compensation Layer

A biaxially stretched polypropylene film (Trephan B024-100 (trade name) (thickness: 60 μm) manufactured by Toray Industries, Inc.) was attached to both sides of a polycarbonate-based resin film with a thickness of 100 μm via an acrylic pressure-sensitive adhesive layer (thickness: 15 μm). After that, the film was stretched 1.32 times in an air circulation thermostat oven (the temperature at a distance of 3 cm from the film reverse surface was measured/temperature variation: ±1° C.) at 150° C. while the longitudinal direction of the film was held by a roll stretching machine to obtain a stretched film (thickness: 55 μm). The in-plane retardation $Re_1$ of the obtained stretched film was 270 nm, the thickness direction retardation $Rth_1$ was 135 nm, and the Nz coefficient ($Rth_1/Re_1$) was 0.5. The glass transition temperature (Tg) of the polycarbonate-based resin film was 136° C., and the in-plane retardation and the thickness direction retardation before stretching were 5 nm and 12 nm, respectively.

Production Example 3

Production of Film for Second Optical Compensation Layer (C)

A long norbornene-based resin film (Zeonor (trade name), thickness: 40 μm, photoelastic coefficient: $3.10 \times 10^{-12}$ m$^2$/N, manufactured by Nippon Zeon Co., Ltd.) was uniaxially stretched 1.52 times at 140° C. to produce a long film and used as a film for a second optical compensation layer (C). The thickness of the film was 35 μm and the in-plane retardation $Re_2$ thereof was 140 nm.

Production Example 4

Production of Film for Second Optical Compensation Layer (D)

A long norbornene-based resin film (Zeonor (trade name), thickness: 50 μm, photoelastic coefficient: $3.0 \times 10^{-12}$ m$^2$/N, manufactured by Nippon Zeon Co., Ltd.) was uniaxially stretched 2.25 times at 140° C. to produce a long film and used as a film for a second optical compensation layer (D). The thickness of the film was 35 μm and the in-plane retardation $Re_2$ thereof was 270 nm.

Production Example 5

Production of Third Optical Compensation Layer (3-1)

90 parts by weight of the nematic liquid crystal compound represented by the following Formula (10), 10 parts by weight of a chiral agent represented by the following Formula (38), 5 parts by weight of a photopolymerization initiator (Irgacure 907 manufactured by Ciba Specialty Chemicals Inc.), and 300 part by weight of methyl ethyl ketone were mixed uniformly to prepare a liquid crystal application liquid. A base material (biaxially stretched PET film) was coated with the liquid crystal application liquid by spin coating, subjected to heat treatment at 80° C. for 3 minutes, and polymerized by the irradiation of UV light (20 mJ/cm$^2$, wavelength: 365 nm), whereby a long third optical compensation layer (3-1) (cholesteric alignment fixed layer) having a refractive index profile of nx=ny>nz was formed. The thickness of the third optical compensation layer (3-1) was 4 µm, the in-plane retardation Re$_3$ thereof was 0 nm, and the thickness direction retardation Rth$_3$ thereof was 240 nm.

Production Example 6

Production of Laminate (X)

The polarizing plate obtained in Production Example 1 and the film for a second optical compensation layer (C) obtained in Production Example 3 were attached to each other using an acrylic adhesive (thickness: 12 µm) to produce a laminate (X).

Note that the film for a second optical compensation layer (C) was placed so that a slow axis thereof was 45° in a clockwise direction with respect to an absorption axis of the polarizer of the polarizing plate.

Example 1

An isocyanate resin-based adhesive layer (thickness: 4 µm) was applied to the principal plane of the third optical compensation layer (3-1) obtained in Production Example 5-1. The third optical compensation layer (3-1) was attached (transferred) to the film for a second optical compensation layer (C) obtained in Production Example 3 so that the isocyanate resin-based adhesive layer (thickness: 4 µm) applied

[Chemical Formula 2]

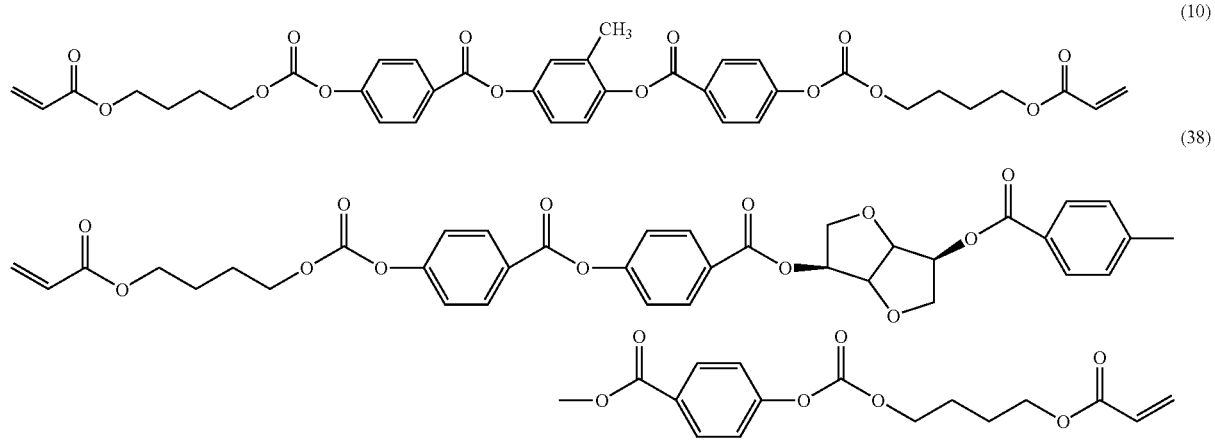

Production Example 5-2

Production of Third Optical Compensation Layer (3-2)

90 parts by weight of the nematic liquid crystal compound represented by the following Formula (10), 10 parts by weight of a chiral agent represented by the following Formula (38), 5 parts by weight of a photopolymerization initiator (Irgacure 907 manufactured by Ciba Specialty Chemicals Inc.), and 300 part by weight of methyl ethyl ketone were mixed uniformly to prepare a liquid crystal application liquid. A base material (biaxially stretched PET film) was coated with the liquid crystal application liquid by spin coating, subjected to heat treatment at 80° C. for 3 minutes, and polymerized by the irradiation of UV light (20 mJ/cm$^2$, wavelength: 365 nm), whereby a long third optical compensation layer (3-2) (cholesteric alignment fixed layer) having a refractive index profile of nx=ny>nz was formed. The thickness of the third optical compensation layer (3-2) was 2.1 µm, the in-plane retardation Re$_3$ thereof was 0 nm, and the thickness direction retardation Rth$_3$ thereof was 120 nm.

to the principal plane of the third optical compensation layer (3-1) was opposed to the film for a second optical compensation layer (C). The adhesive layer was cured at 50° C. for about 10 hours with warming.

Then, a surface of the film for a second optical compensation layer (C) on an opposite side of the third optical compensation layer (3-1) and the first optical compensation layer obtained in Production Example 2 were attached to each other, using an acrylic pressure-sensitive adhesive (thickness: 12 µm).

Further, the polarizing plate obtained in Production Example 1 was attached to a surface of the first optical compensation layer on an opposite side of the film for a second optical compensation layer (C), using an acrylic adhesive (thickness: 12 µm).

Then, a base material (biaxially stretched PET film) supporting the third optical compensation layer (3-1) was peeled to obtain a laminated optical film (1).

Note that the first optical compensation layer was placed so that a slow axis thereof was parallel to an absorption axis of the polarizer of the polarizing plate. Further, the film for a second optical compensation layer (C) was placed so that a slow axis thereof was 45° in a counterclockwise direction with respect to the absorption axis of the polarizer of the polarizing plate.

Example 2

A laminated optical film (2) was obtained in the same way as in Example 1 except that the first optical compensation layer was placed so that a slow axis thereof was perpendicular to an absorption axis of the polarizer of the polarizing plate.

Comparative Example 1

An isocyanate resin-based adhesive layer (thickness: 4 μm) was applied to the principal plane of the third optical compensation layer (3-1) obtained in Production Example 5-1. The third optical compensation layer (3-1) was attached (transferred) to the film for a second optical compensation layer (C) obtained in Production Example 3 so that the isocyanate resin-based adhesive layer (thickness: 4 μm) applied to the principal plane of the third optical compensation layer (3-1) was opposed to the film for a second optical compensation layer (C). The adhesive layer was cured at 50° C. for about 10 hours with warming.

Further, the polarizing plate obtained in Production Example 1 was attached to a surface of the film for a second optical compensation layer (C) on an opposite side of the third optical compensation layer (3-1), using an acrylic adhesive (thickness: 12 μm).

Then, a base material (biaxially stretched PET film) supporting the third optical compensation layer (3-1) was peeled to obtain a laminated optical film (C1).

Note that the film for a second optical compensation layer (C) was placed so that a slow axis thereof was 45° in a counterclockwise direction with respect to the absorption axis of the polarizer of the polarizing plate.

Comparative Example 2

An isocyanate resin-based adhesive layer (thickness: 4 μm) was applied to the principal plane of the third optical compensation layer (3-1) obtained in Production Example 5-1. The third optical compensation layer (3-1) was attached (transferred) to the film for a second optical compensation layer (C) obtained in Production Example 3 so that the isocyanate resin-based adhesive layer (thickness: 4 μm) applied to the principal plane of the third optical compensation layer (3-1) was opposed to the film for a second optical compensation layer (C). The adhesive layer was cured at 50° C. for about 10 hours with warming.

Then, a surface of the film for a second optical compensation layer (C) on an opposite side of the third optical compensation layer (3-1) and the film for a second optical compensation layer (D) obtained in Production Example 4 were attached to each other, using an acrylic pressure-sensitive adhesive (thickness: 12 μm).

Further, the polarizing plate obtained in Production Example 1 was attached to a surface of the film for a second optical compensation layer (D) on an opposite side of the third optical compensation layer (3-1), using an acrylic adhesive (thickness: 12 μm).

Then, a base material (biaxially stretched PET film) supporting the third optical compensation layer (3-1) was peeled to obtain a laminated optical film (C2).

Note that the film for a second optical compensation layer (C was placed so that a slow axis thereof was 45° in a counterclockwise direction with respect to the absorption axis of the polarizer of the polarizing plate. The film for a second optical compensation layer (D) was placed so that a slow axis thereof was parallel to an absorption axis of the polarizer of the polarizing plate.

Comparative Example 3

A laminated optical film (C3) was obtained in the same way as in Comparative Example 2 except that the film for a second optical compensation layer (D) was placed so that a slow axis thereof was perpendicular to an absorption axis of the polarizer of the polarizing plate.

Example 3

The third optical compensation layer (3-1) on the laminated optical film (1) obtained in Example 1 was laminated on a backlight-side glass base material of a VA-mode liquid crystal cell (PlayStation Portable manufactured by Sony Corporation) via an acrylic pressure-sensitive adhesive (thickness: 20 μm). Further, the film for a second optical compensation layer (C) on the laminate (X) obtained in Production Example 6 was laminated on a viewer-side glass base material of the liquid crystal cell via an acrylic pressure-sensitive adhesive (thickness: 20 μm). At this time, these laminations were performed so that the absorption axis of the polarizer in the laminated optical film (1) and the absorption axis of the polarizer in the laminate (X) were perpendicular to each other. Thus, a liquid crystal panel (1) was obtained.

The liquid crystal panel (1) had a configuration of [polarizing plate (axis-angle=0°)]/[first optical compensation layer (axis angle=0°)]/[film for a second optical compensation layer (C) (axis angle=45°)]/[third optical compensation layer (3-1)]/[liquid crystal cell]/[film for a second optical compensation layer (C) (axis angle=135°)]/[polarizing plate (axis angle=90°)] in the stated order from the backlight side to the viewer side. Herein, the "axis" in the "axis angle" refers to an absorption axis of a polarizer in the case of a polarizing plate, and refers to a slow axis in the other cases.

Figure 6:
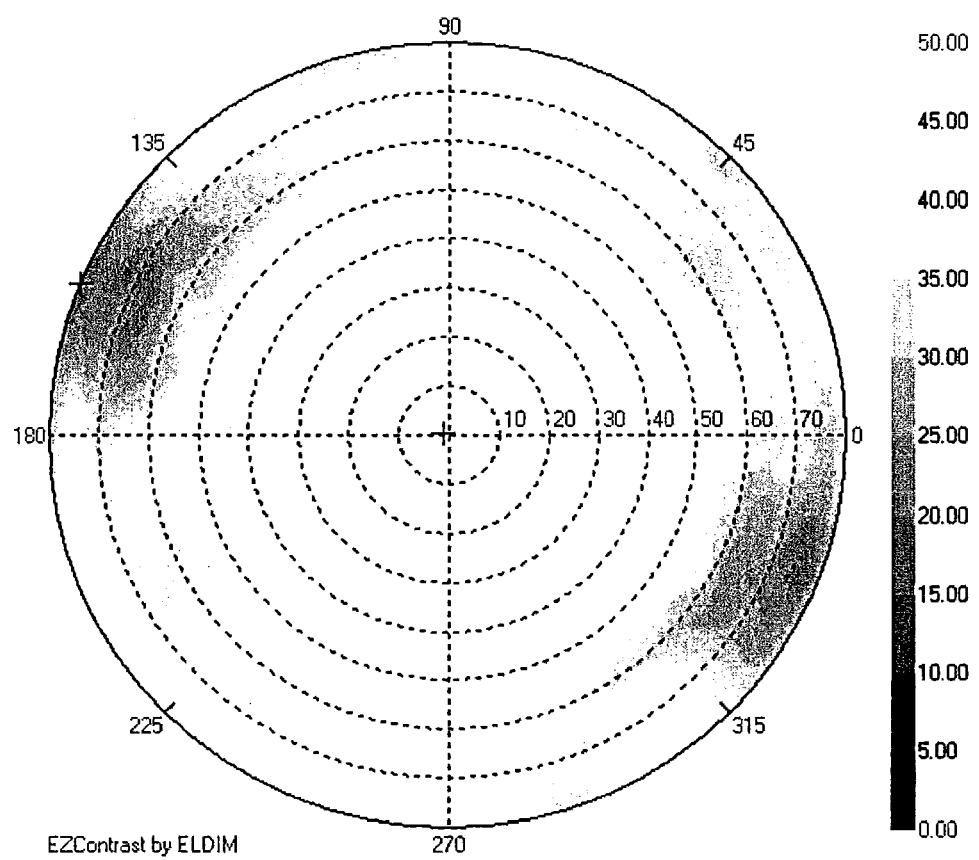
FIG. 6 A chart diagram showing measurement results of viewing angle characteristics of a liquid crystal panel (1).

FIG. 6 shows the results obtained by measuring the viewing angle characteristics of the liquid crystal panel (1).

Figure 7:
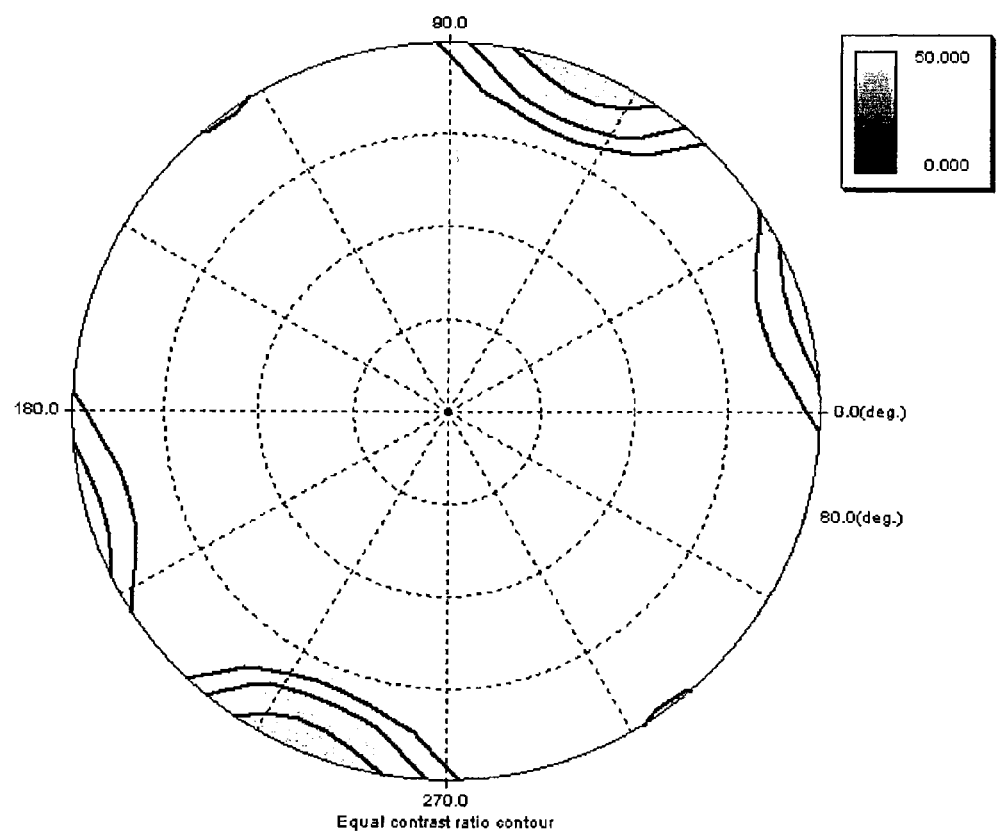
FIG. 7 A chart diagram showing measurement results of viewing angle characteristics of the liquid crystal panel (1) by computer simulation.

Further, FIG. 7 shows the results obtained by measuring viewing angle characteristics by computer simulation of the liquid crystal panel.

Example 4

A liquid crystal panel (2) was obtained in the same way as in Example 3 except for using the laminated optical film (2) obtained in Example 2 in place of the laminated optical film (1).

The liquid crystal panel (2) had a configuration of [polarizing plate (axis angle=0°)]/[first optical compensation layer (axis angle=90°)]/[film for a second optical compensation layer (C) (axis angle=45°)]/[third optical compensation layer (3-1)]/[liquid crystal cell]/[film for a second optical compensation layer (C) (axis angle=135°)]/[polarizing plate (axis angle=90°)] in the stated order from the backlight side to the viewer side. Herein, the "axis" in the "axis angle" refers to an absorption axis of a polarizer in the case of a polarizing plate, and refers to a slow axis in the other cases.

Figure 8:
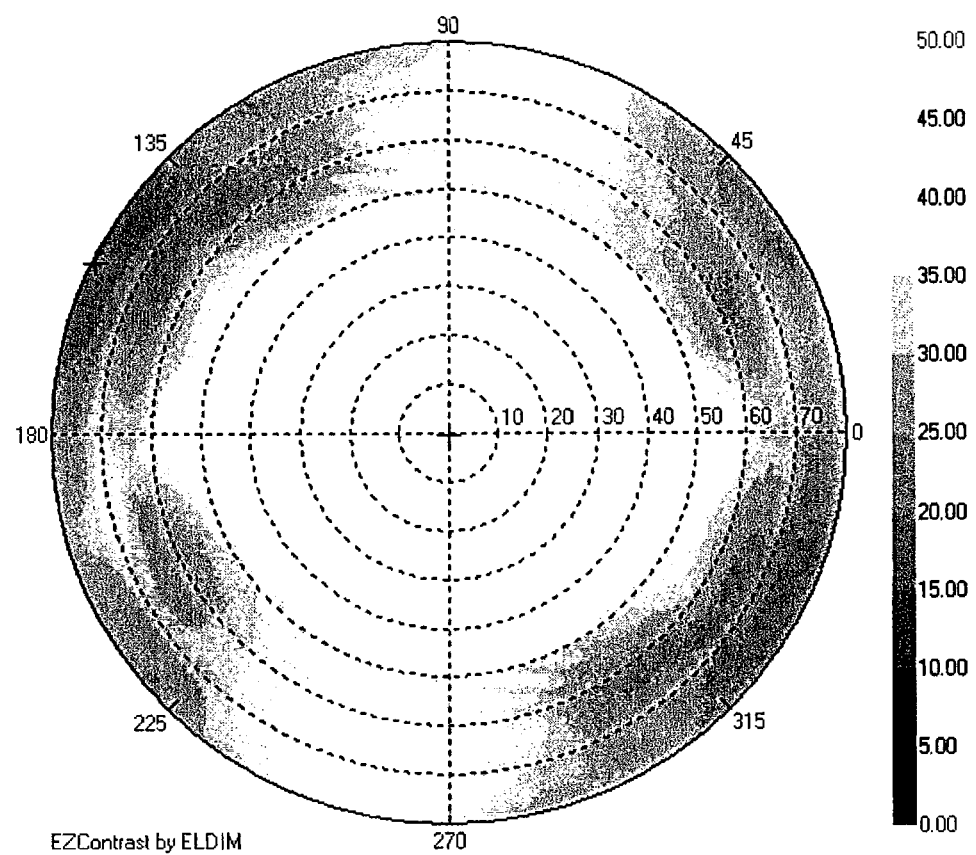
FIG. 8 A chart diagram showing measurement results of viewing angle characteristics of a liquid crystal panel (2).

FIG. 8 shows the results obtained by measuring the viewing angle characteristics of the liquid crystal panel (2).

Figure 9:
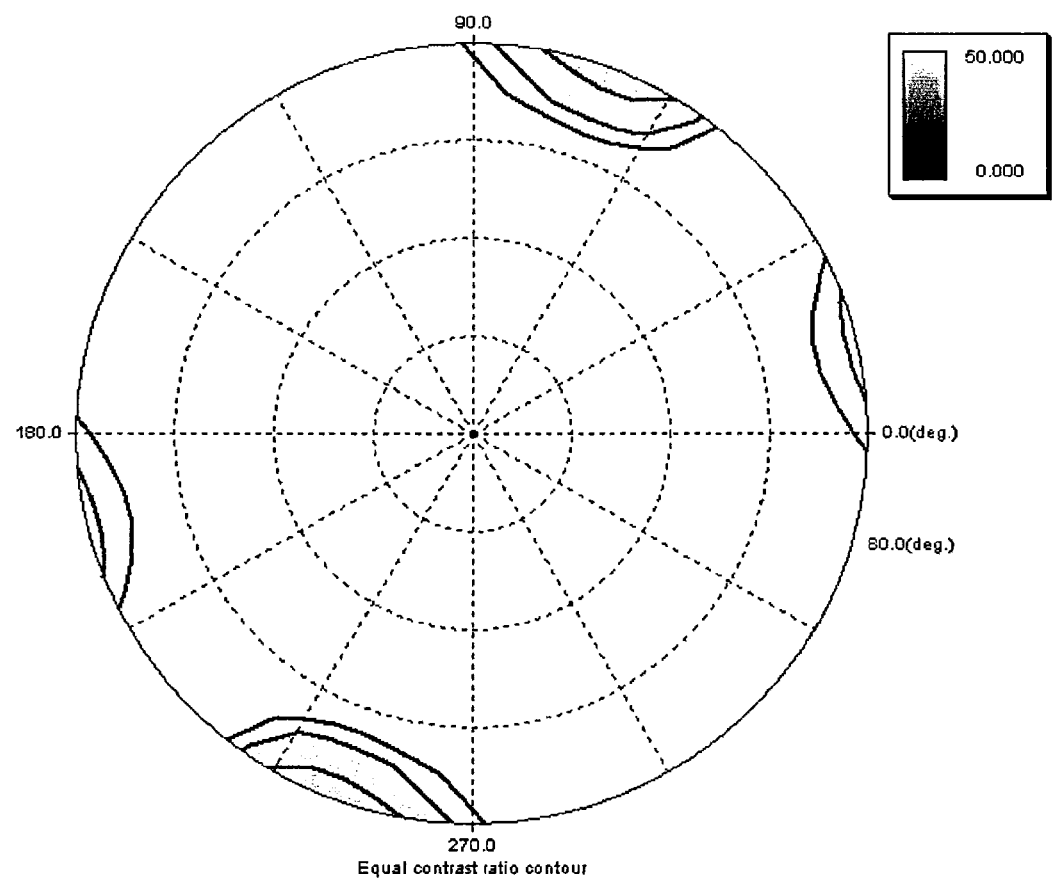
FIG. 9 A chart diagram showing measurement results of viewing angle characteristics of the liquid crystal panel (2) by computer simulation.

Further, FIG. 9 shows the results obtained by measuring viewing angle characteristics by computer simulation of the liquid crystal panel.

Comparative Example 4

A liquid crystal panel (C1) was obtained in the same way as in Example 3 except for using the laminated optical film (C1) obtained in Comparative Example 1 in place of the laminated optical film (1).

The liquid crystal panel (C1) had a configuration of [polarizing plate (axis angle=0°)]/[film for a second optical compensation layer (C) (axis angle=45°)]/[third optical compensation layer (3-1)]/[liquid crystal cell]/[film for a second optical compensation layer (C) (axis angle=135°)]/[polarizing plate (axis angle=90°)] in the stated order from the backlight side to the viewer side. Herein, the "axis" in the "axis angle" refers to an absorption axis of a polarizer in the case of a polarizing plate, and refers to a slow axis in the other cases.

Figure 10:
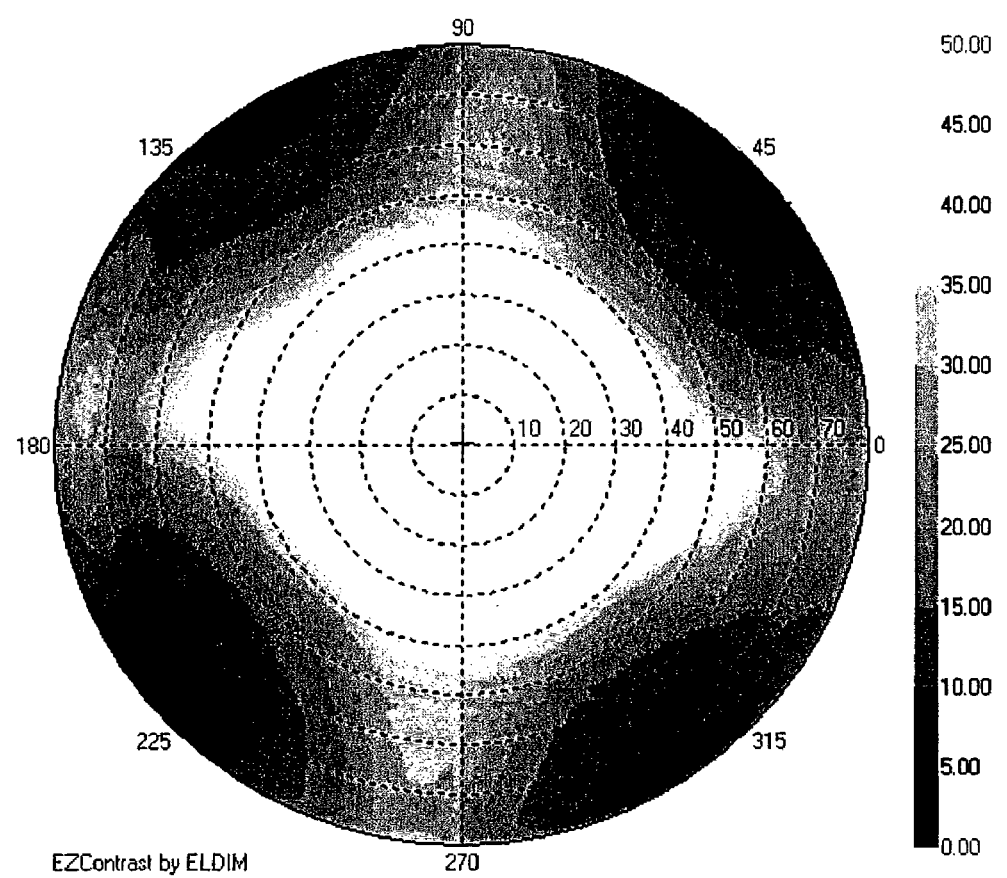
FIG. 10 A chart diagram showing measurement results of viewing angle characteristics of a liquid crystal panel (C1).

FIG. 10 shows the results obtained by measuring the viewing angle characteristics of the liquid crystal panel (C1).

Figure 11:
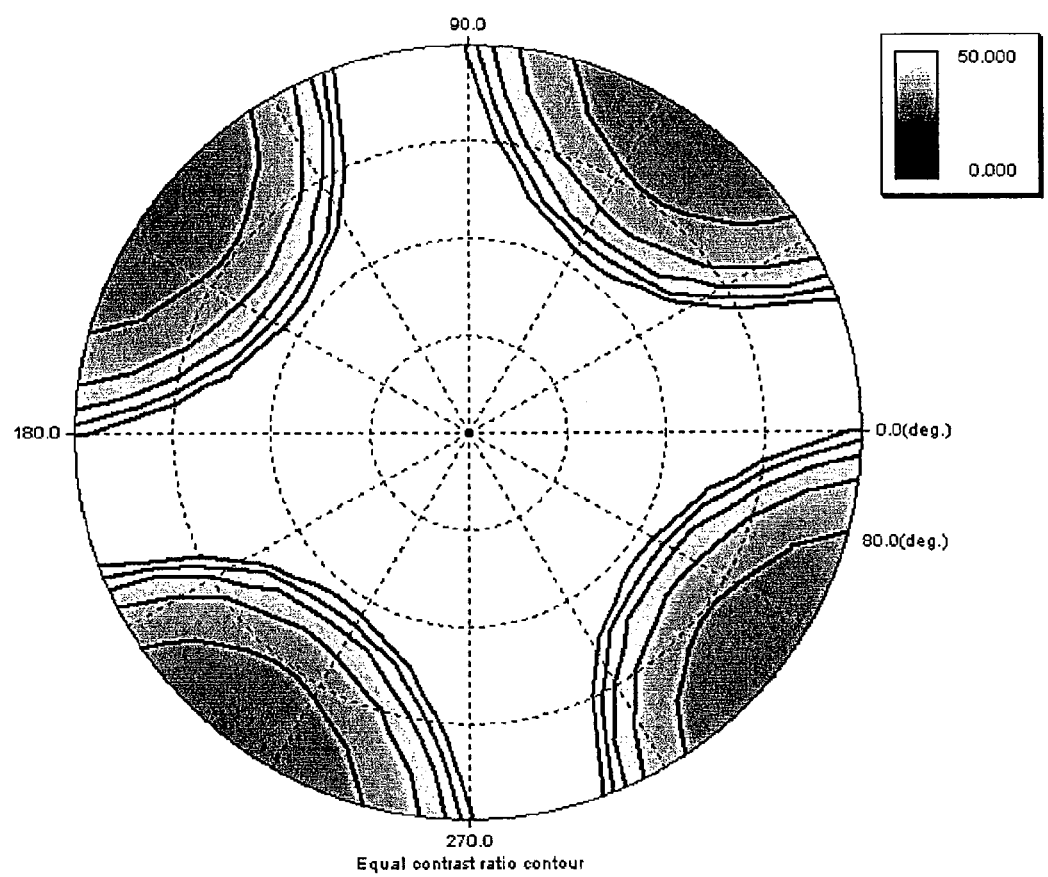
FIG. 11 A chart diagram showing measurement results of viewing angle characteristics of the liquid crystal panel (C1) by computer simulation.

Further, FIG. 11 shows the results obtained by measuring viewing angle characteristics by computer simulation of the liquid crystal panel.

Comparative Example 5

A liquid crystal panel (C2) was obtained in the same way as in Example 3 except for using the laminated optical film (C2) obtained in Comparative Example 2 in place of the laminated optical film (1).

The liquid crystal panel (C2) had a configuration of [polarizing plate (axis angle=0°)]/[film for a second optical compensation layer (D) (axis angle=0°)]/[film for a second optical compensation layer (C) (axis angle=45°)]/[third optical compensation layer (3-1)]/[liquid crystal cell]/[film for a second optical compensation layer (C) (axis angle=135°)]/[polarizing plate (axis angle=9.0°)] in the stated order from the backlight side to the viewer side. Herein, the "axis" in the "axis angle" refers to an absorption axis of a polarizer in the case of a polarizing plate, and refers to a slow axis in the other cases.

Figure 12:
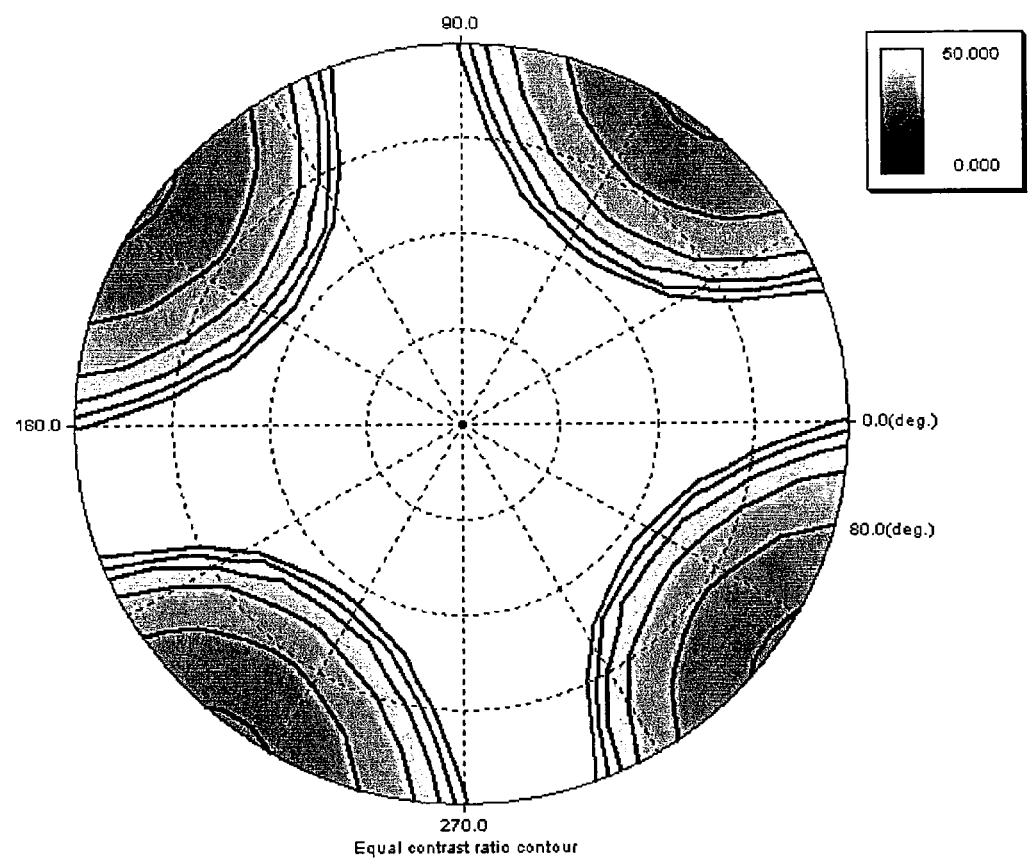
FIG. 12 A chart diagram showing measurement results of viewing angle characteristics of a liquid crystal panel (C2) by computer simulation.

FIG. 12 shows the results obtained by measuring viewing angle characteristics by computer simulation of the liquid crystal panel.

Comparative Example 6

A liquid crystal panel (C3) was obtained in the same way as in Example 3 except for using the laminated optical film (C3) obtained in Comparative Example 3 in place of the laminated optical film (1).

The liquid crystal panel (C3) had a configuration of [polarizing plate (axis angle=0°)]/[film for a second optical compensation layer (D) (axis angle=90°)]/[film for a second optical compensation layer (C) (axis angle=45°)]/[third optical compensation layer (3-1)]/[liquid crystal cell]/[film for a second optical compensation layer (C) (axis angle=135°)]/[polarizing plate (axis angle=90°)] in the stated order from the backlight side to the viewer side. Herein, the "axis" in the "axis angle" refers to an absorption axis of a polarizer in the case of a polarizing plate, and refers to a slow axis in the other cases.

Figure 13:
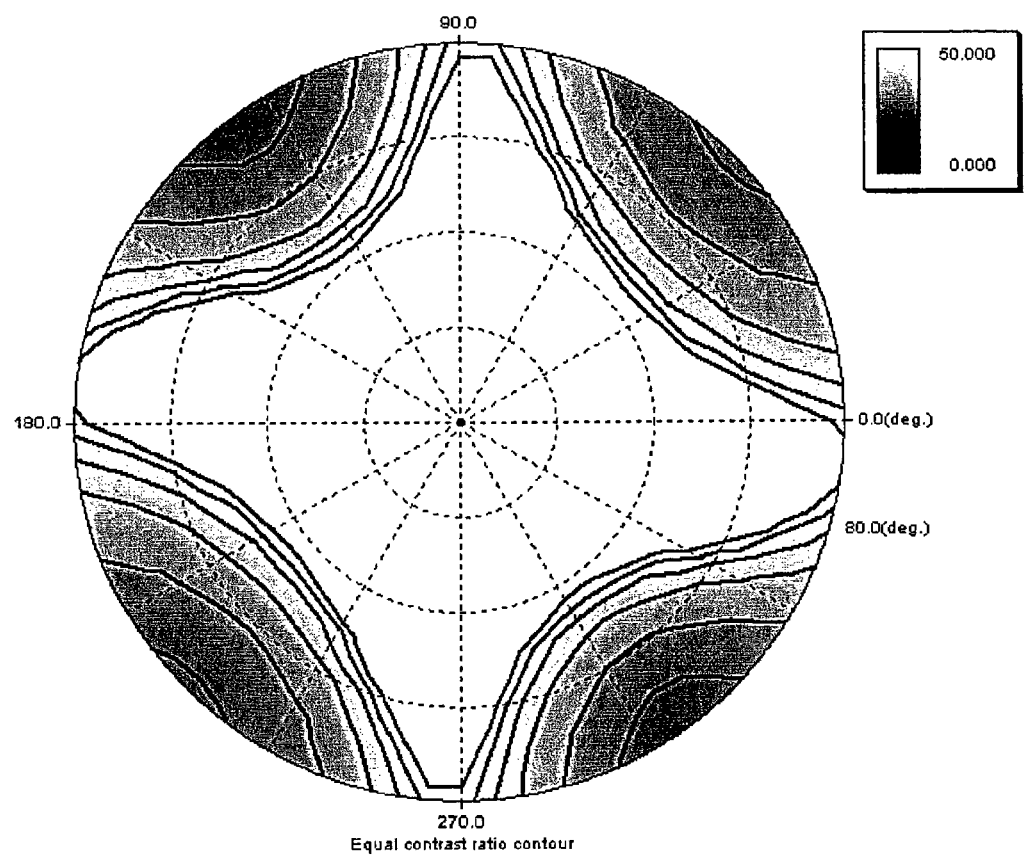
FIG. 13 A chart diagram showing measurement results of viewing angle characteristics of a liquid crystal panel (C3) by computer simulation.

Further, FIG. 13 shows the results obtained by measuring viewing angle characteristics by computer simulation of such a liquid crystal panel.

Example 5

The film for a second optical compensation layer (C) obtained in Production Example 3 and the first optical compensation layer obtained in Production Example 2 were attached to each other, using an acrylic pressure-sensitive adhesive (thickness: 12 µm).

Further, the polarizing plate obtained in Production Example 1 was attached to a surface of the first optical compensation layer on an opposite side of the film for a second optical compensation layer (C), using an acrylic adhesive (thickness: 12 µm).

Thus, a laminated optical film (3) was obtained.

The first optical compensation layer was placed so that a slow axis thereof was perpendicular to an absorption axis of the polarizer of the polarizing plate. Further, the film for a second optical compensation layer (C) was placed so that a slow axis thereof was 45° in a counterclockwise direction with respect to the absorption axis of the polarizer of the polarizing plate.

The third optical compensation layer (3-1) on the laminated optical film (C1) obtained in Comparative Example 1 was laminated on a backlight-side glass base material of a VA-mode liquid crystal cell (PlayStation Portable manufactured by Sony Corporation) via an acrylic pressure-sensitive adhesive (thickness: 20 µm). Further, the film for a second optical compensation layer (C) on the laminated optical film (3) obtained above was laminated on a viewer-side glass base material of the liquid crystal cell via an acrylic pressure-sensitive adhesive (thickness: 20 µm). At this time, these laminations were performed so that the absorption axis of the polarizer in the laminated optical film (3) and the absorption axis of the polarizer in the laminated optical film (C1) were perpendicular to each other. Thus, a liquid crystal panel (3) was obtained.

The liquid crystal panel (3) had a configuration of [polarizing plate (axis angle=0°)]/[film for a second optical compensation layer (C) (axis angle=45°)]/[third optical compensation layer (3-1)]/[liquid crystal cell]/[film for a second optical compensation layer (C) (axis angle=135°)]/[first optical compensation layer (axis angle=0°)]/[polarizing plate (axis angle=90°)] in the stated order from the backlight side to the viewer side. Herein, the "axis" in the "axis angle" refers to an absorption axis of a polarizer in the case of a polarizing plate, and refers to a slow axis in the other cases.

Figure 14:
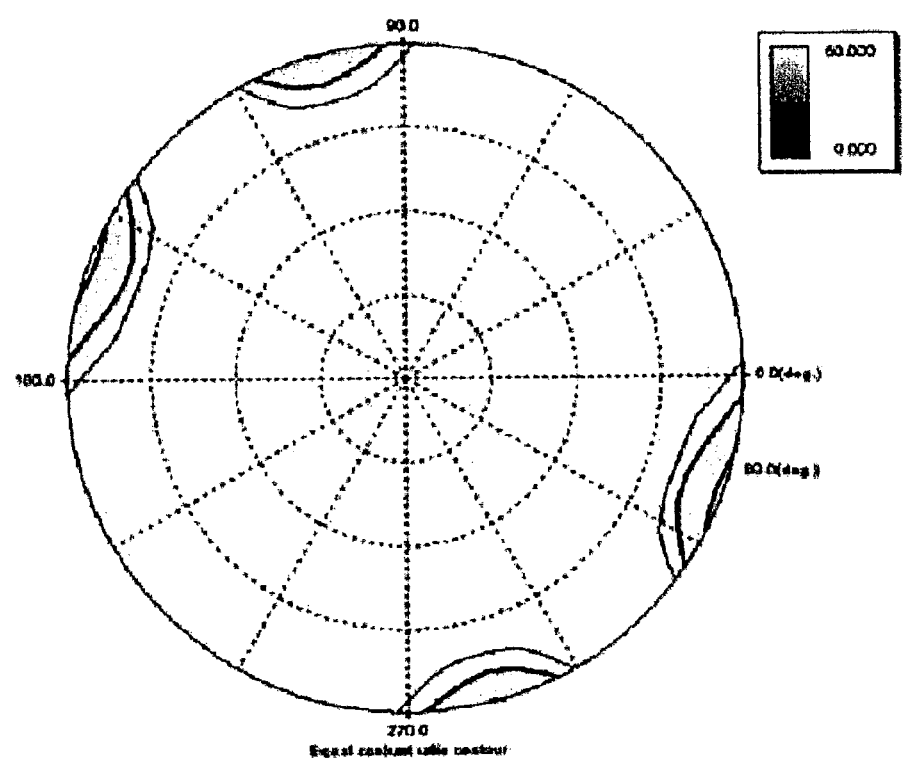
FIG. 14 A chart diagram showing measurement results of viewing angle characteristics of a liquid crystal panel (3) by computer simulation.

FIG. 14 shows the results obtained by measuring the viewing angle characteristics by computer simulation of the liquid crystal panel (3).

Example 6

The film for a second optical compensation layer (C) obtained in Production Example 3 and the first optical compensation layer obtained in Production Example 2 were attached to each other, using an acrylic pressure-sensitive adhesive (thickness: 12 µm).

Further, the polarizing plate obtained in Production Example 1 was attached to a surface of the first optical compensation layer on an opposite side of the film for a second optical compensation layer (C), using an acrylic adhesive (thickness: 12 µm).

Thus, a laminated optical film (4) was obtained.

Note that the first optical compensation layer was placed so that a slow axis thereof was perpendicular to an absorption axis of the polarizer of the polarizing plate. Further, the film for a second optical compensation layer, (C) was placed so that a slow axis thereof was 45° in a counterclockwise direction with respect to the absorption axis of the polarizer of the polarizing plate.

A liquid crystal panel (4) was obtained in the same way as in Example 5 except for using the laminated optical film (4) obtained above in place of the laminated optical film (3).

The liquid crystal panel (4) had a configuration of [polarizing plate (axis angle=0°)]/[film for a second optical compensation layer (C) (axis angle=45°)]/[third optical compensation layer (3-1)]/[liquid crystal cell]/[film for a second optical compensation layer (C) (axis angle=135°)]/[first optical compensation layer (axis angle=90°)]/[polarizing plate (axis angle=90°)] in the stated order from the backlight side to the viewer side. Herein, the "axis" in the "axis angle" refers to an absorption axis of a polarizer in the case of a polarizing plate, and refers to a slow axis in the other cases.

Figure 15:
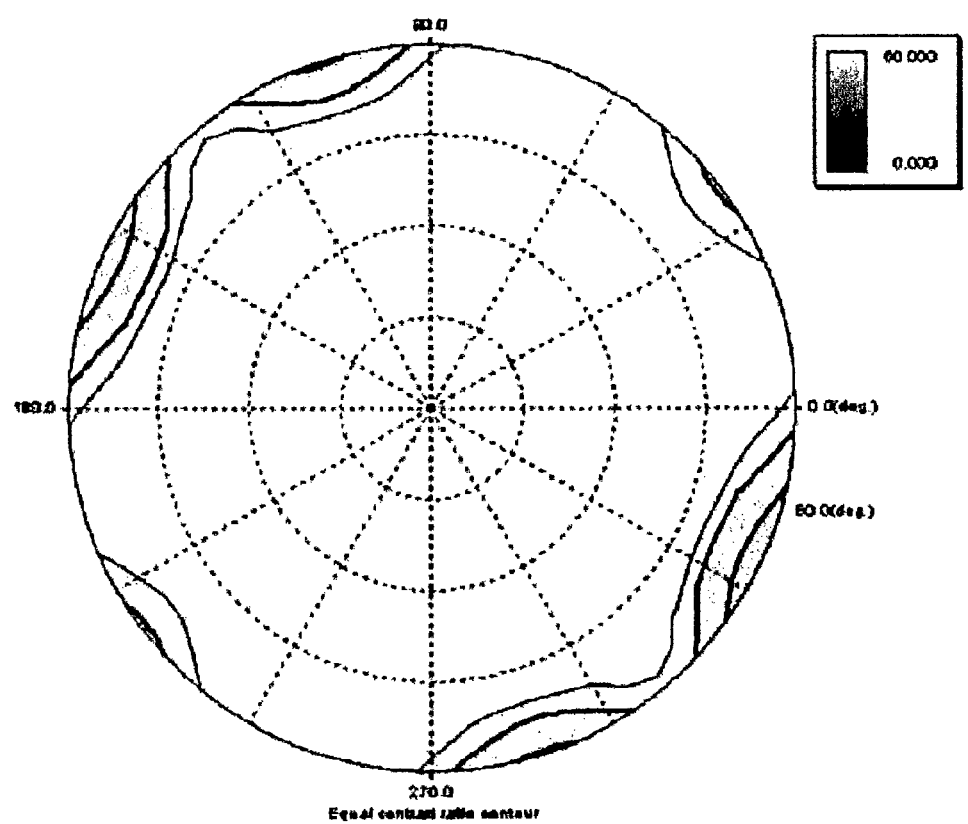
FIG. 15 A chart diagram showing measurement results of viewing angle characteristics of a liquid crystal panel (4) by computer simulation.

FIG. 15 shows the results obtained by measuring viewing angle characteristics by computer simulation of the liquid crystal panel.

Example 7

A laminated optical film (5) was obtained in the same way as in Example 1, except for using the third optical compensation layer (3-2) obtained in Production Example 5-2 in place of the third optical compensation layer (3-1) obtained in Production Example 5-1.

A laminated optical film (6) was obtained in the same way as in Comparative Example 1 except for using the third optical compensation layer (3-2) obtained in Production Example 5-2 in place of the third optical compensation layer (3-1) obtained in Production Example 5-1.

The third optical compensation layer (3-2) on the laminated optical film (5) obtained above was laminated on a backlight-side glass base material of a VA-mode liquid crystal cell (PlayStation Portable manufactured by Sony Corporation) via an acrylic pressure-sensitive adhesive (thickness: 20 µm). Further, the third optical compensation layer (3-2) on the laminated optical film (6) obtained above was laminated on a viewer-side glass base material of the liquid crystal cell via an acrylic pressure-sensitive adhesive (thickness: 20 µm). At this time, these laminations were performed so that the absorption axis of the polarizer in the laminated optical film (5) and the absorption axis of the polarizer in the laminated optical film (6) were perpendicular to each other. Thus, a liquid crystal panel (5) was obtained.

The liquid crystal panel (5) had a configuration of [polarizing plate (axis angle=0°)]/[first optical compensation layer (axis angle=0°)]/[film for a second optical compensation layer (C) (axis angle=45°)]/[third optical compensation layer (3-2)]/[liquid crystal cell]/[third optical compensation layer (3-2)]/[film for a second optical compensation layer (C) (axis angle=135°)]/[polarizing plate (axis angle=90°)] in the stated order from the backlight side to the viewer side. Herein, the "axis" in the "axis angle" refers to an absorption axis of a polarizer in the case of a polarizing plate, and refers to a slow axis in the other cases.

Figure 16:
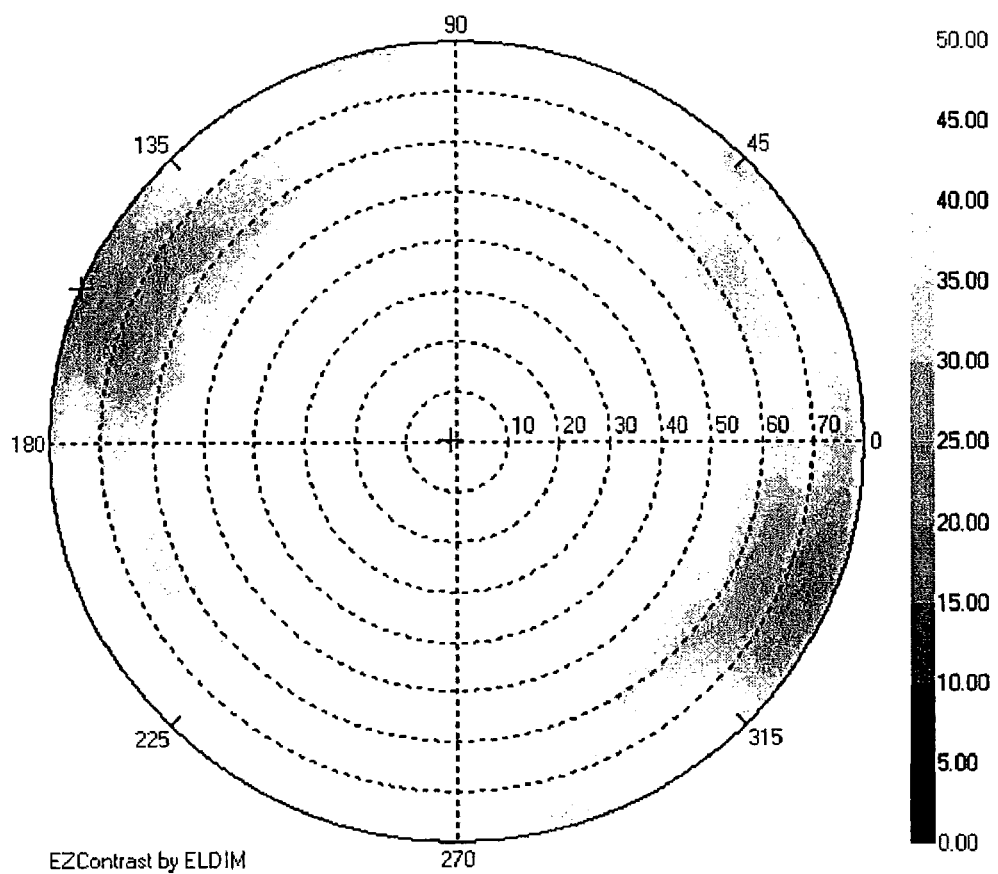
FIG. 16 A chart diagram showing measurement results of viewing angle characteristics of a liquid crystal panel (5).

FIG. 16 shows the results obtained by measuring the viewing angle characteristics of the liquid crystal panel (5).

Figure 17:
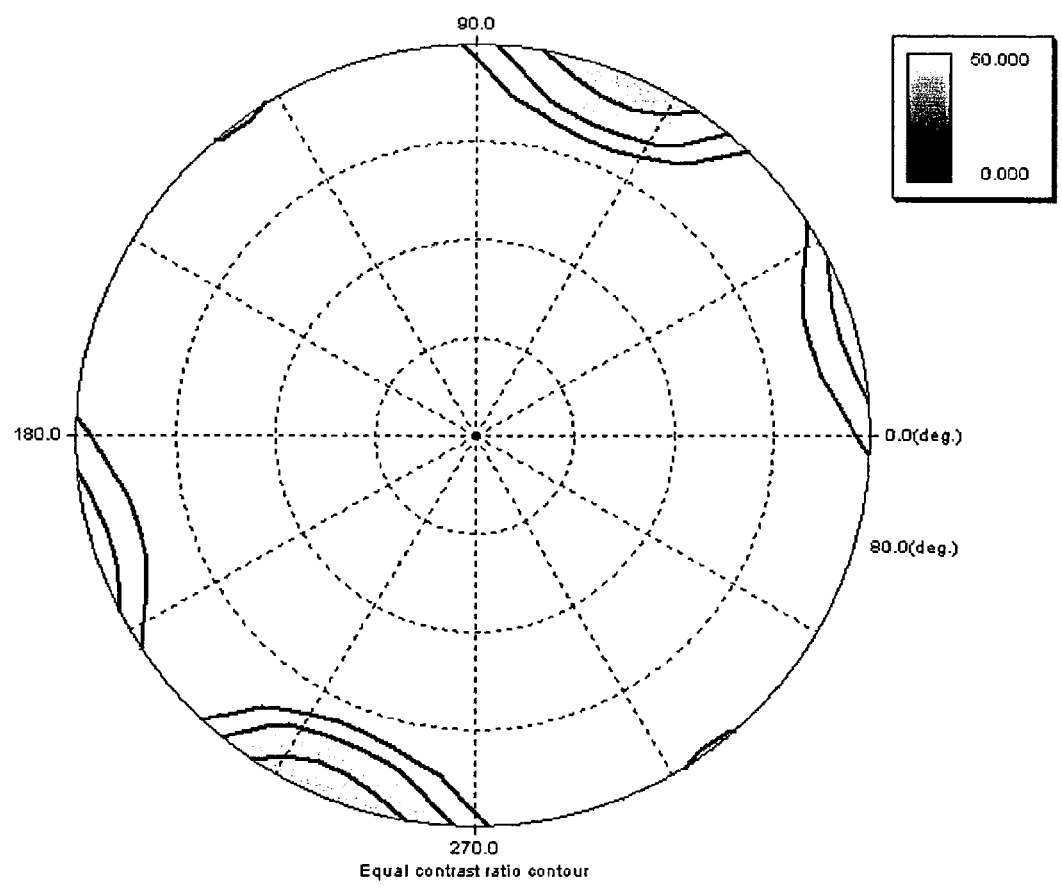
FIG. 17 A chart diagram showing measurement results of viewing angle characteristics of the liquid crystal panel (5) by computer simulation.

Further, FIG. 17 shows the results obtained by measuring viewing angle characteristics by computer simulation of the liquid crystal panel.

[Evaluation]

It is understood from FIGS. 6 to 17 that the viewing angle characteristics of the liquid crystal panel using the laminated optical film of the present invention are enhanced remarkably compared with the liquid crystal panel that does not use the laminated optical film of the present invention.

Industrial Applicability

The laminated optical film and the liquid crystal panel and liquid crystal display apparatus using the laminated optical film of the present invention are used for any appropriate application. Examples of the application include: office automation (OA) devices such as a personal computer monitor, a laptop personal computer, and a copying machine; portable devices such as a cellular phone, a watch, a digital camera, a personal digital assistance (PDA), and a portable game machine; domestic electric appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

The invention claimed is:

1. A laminated optical film, comprising a polarizer, a first optical compensation layer, and a second optical compensation layer, in the stated order, wherein:
   the first optical compensation layer has a refractive index profile of nx>nz>ny and is placed so that a slow axis direction thereof is substantially parallel to or substantially perpendicular to an absorption axis direction of the polarizer,
   the second optical compensation layer converts linearly polarized light into circularly polarized light or circularly polarized light into linearly polarized light in a visible light region, and
   the second optical compensation layer is placed so that the slow axis direction is not substantially parallel to or not substantially perpendicular to the absorption axis direction of the polarizer.

2. A laminated optical film according to claim 1, wherein the first optical compensation layer has an Nz coefficient of 0.1 to 0.6.

3. A laminated optical film according to claim 1, wherein the first optical compensation layer is formed of one retardation film (A).

4. A laminated optical film according to claim 3, wherein the retardation film (A) contains at least one kind of thermoplastic resin selected from a norbornene-based resin, a cellulose-based resin, a carbonate-based resin, and an ester-based resin.

5. A laminated optical film according to claim 1, wherein the second optical compensation layer is formed of one retardation film (B), and is placed so that a slow axis direction of the retardation film (B) is placed substantially at an angle of 45° with respect to the absorption axis direction of the polarizer.

6. A laminated optical film according to claim 5, wherein the retardation film (B) has an in-plane retardation Re[590] at a wavelength of 590 nm larger than an in-plane retardation Re[480] at a wavelength of 480 nm.

7. A laminated optical film according to claim 5, wherein the retardation film (B) includes at least one kind of thermoplastic resin selected from a cellulose-based resin, a carbonate-based resin, a vinyl acetal-based resin, and a norbornene-based resin.

8. A laminated optical film according to claim 1, wherein the second optical compensation layer is formed of two retardation films (C) and (D), the retardation film (C) is placed between the polarizer and the retardation film (D), and an angle α° formed by a slow axis direction of the retardation film (C) and an absorption axis direction of the polarizer and an angle β° formed by a slow axis direction of the retardation film (D) and an absorption axis direction of the polarizer have a relationship of $(2\alpha+30)<\beta<(2\alpha+60)$.

9. A laminated optical film according to claim 8, wherein the retardation film (C) has an in-plane retardation Re[590] at a wavelength of 590 nm equal to or less than an in-plane retardation Re[480] at a wavelength of 480 nm.

10. A laminated optical film according to claim 8, wherein the retardation film (D) has an in-plane retardation Re[590] at a wavelength of 590 nm equal to or less than an in-plane retardation Re[480] at a wavelength of 480 nm.

11. A laminated optical film according to claim 8, wherein the retardation film (C) and/or the retardation film (D) includes at least one kind of thermoplastic resin chosen from a norbornene-based resin and a carbonate-based resin.

12. A laminated optical film according to claim 1, comprising a third optical compensation layer on a side of the second optical compensation layer opposite to the first optical compensation layer, wherein the third optical compensation layer has a refractive index profile of $nx=ny>nz$.

13. A laminated optical film according to claim 12, wherein the third optical compensation layer includes a retardation film formed of a cholesteric alignment fixed layer.

14. A laminated optical film according to claim 12, wherein the third optical compensation layer includes a retardation film containing an imide-based resin.

15. A liquid crystal panel, comprising the laminated optical film according to claim 1.

16. A liquid crystal display apparatus, comprising the liquid crystal panel according to claim 15.

* * * * *